United States Patent
Citta et al.

(10) Patent No.: US 9,414,110 B2
(45) Date of Patent: Aug. 9, 2016

(54) PREAMBLE FOR A DIGITAL TELEVISION SYSTEM

(75) Inventors: Richard W. Citta, Oak Park, IL (US); David Emery Virag, Noblesville, IN (US); Barth Alan Canfield, Indianapolis, IN (US); Scott Matthew Lopresto, Chicago, IL (US)

(73) Assignee: THOMSON LICENSING, Issy les-Moulineaux (FR)

(*) Notice: Subject to any disclaimer, the term of this patent is extended or adjusted under 35 U.S.C. 154(b) by 766 days.

(21) Appl. No.: 12/734,154

(22) PCT Filed: Oct. 14, 2008

(86) PCT No.: PCT/US2008/011711
§ 371 (c)(1),
(2), (4) Date: Apr. 13, 2010

(87) PCT Pub. No.: WO2009/051693
PCT Pub. Date: Apr. 23, 2009

(65) Prior Publication Data
US 2010/0296576 A1    Nov. 25, 2010

Related U.S. Application Data

(60) Provisional application No. 60/998,978, filed on Oct. 15, 2007, provisional application No. 60/998,961, filed on Oct. 15, 2007, provisional application No. 60/999,040, filed on Oct. 15, 2007, provisional (Continued)

(51) Int. Cl.
*H04L 5/12* (2006.01)
*H04L 1/00* (2006.01)

(Continued)

(52) U.S. Cl.
CPC ............ *H04N 21/435* (2013.01); *H04L 1/005* (2013.01); *H04L 1/006* (2013.01); *H04L 1/0041* (2013.01);

(Continued)

(58) Field of Classification Search
None
See application file for complete search history.

(56) References Cited

U.S. PATENT DOCUMENTS 3,652,998 A    3/1972   Forney, Jr.
3,873,920 A    3/1975   Apple et al.

(Continued)

FOREIGN PATENT DOCUMENTS

CA    2534435 A1    3/2005
CN    1351797 A     5/2002

(Continued)

OTHER PUBLICATIONS

Richer et al, "The ATSC Digital Television System," Proc. IEEE, vol. 94, No. 1, Jan. 2006, pp. 37-43.*

(Continued)

*Primary Examiner* — Reza Aghevli
(74) *Attorney, Agent, or Firm* — Brian J. Dorini; Catherine A. Cooper

(57) ABSTRACT

The present invention concerns a system for transmitting a plurality of modes of digital television signals within the same transmission channel where one transmission mode is more robust than another mode. The present invention also concerns a system for receiving and decoding such signals. More specifically, an aspect of the present invention involves a method and an apparatus for utilizing a proper length of preamble data for the improvement of reception. Furthermore, another aspect of the present invention involves a method and an apparatus for inserting a preamble into a proper place in a transmitted data stream relative to the filed synchronization data. Another aspect of the present invention involves a method and an apparatus for decoding trellis-coded data, using the predetermined preamble data.

24 Claims, 14 Drawing Sheets

Related U.S. Application Data application No. 61/190,499, filed on Aug. 29, 2008, provisional application No. 61/190,516, filed on Aug. 29, 2008, provisional application No. 61/190,517, filed on Aug. 29, 2008.

(51) Int. Cl.

| | | |
|---|---|---|
| *H04N 21/64* | (2011.01) | |
| *H04N 21/435* | (2011.01) | |
| *H04L 25/02* | (2006.01) | |
| *H04N 21/235* | (2011.01) | |
| *H04N 21/2365* | (2011.01) | |
| *H04N 21/2381* | (2011.01) | |
| *H04N 21/61* | (2011.01) | |
| *H04N 21/643* | (2011.01) | |
| *H04L 29/06* | (2006.01) | |

(52) U.S. Cl.
CPC ............ *H04L 1/0045* (2013.01); *H04L 1/0057* (2013.01); *H04L 1/0065* (2013.01); *H04L 1/0068* (2013.01); *H04L 1/0071* (2013.01); *H04L 25/0226* (2013.01); *H04L 65/607* (2013.01); *H04N 21/235* (2013.01); *H04N 21/2353* (2013.01); *H04N 21/2365* (2013.01); *H04N 21/2381* (2013.01); *H04N 21/6131* (2013.01); *H04N 21/64315* (2013.01); *H04L 1/0055* (2013.01)

(56) References Cited

U.S. PATENT DOCUMENTS

| | | |
|---|---|---|
| 4,677,625 A | 6/1987 | Betts et al. |
| 4,881,223 A | 11/1989 | Debuysscher |
| 5,012,491 A | 4/1991 | Iwasaki |
| 5,050,164 A | 9/1991 | Chao |
| 5,087,975 A | 2/1992 | Citta et al. |
| 5,353,313 A | 10/1994 | Honea |
| 5,369,641 A | 11/1994 | Dodt et al. |
| 5,398,073 A | 3/1995 | Wei |
| 5,438,369 A | 8/1995 | Citta et al. |
| 5,452,009 A | 9/1995 | Citta et al. |
| 5,469,448 A | 11/1995 | Denissen et al. |
| 5,534,938 A | 7/1996 | Citta et al. |
| 5,572,532 A | 11/1996 | Fimoff et al. |
| 5,600,677 A | 2/1997 | Citta et al. |
| 5,629,958 A | 5/1997 | Willming |
| 5,636,251 A | 6/1997 | Citta et al. |
| 5,687,182 A | 11/1997 | Shikakura |
| 5,761,303 A | 6/1998 | Hobbs et al. |
| 5,809,242 A | 9/1998 | Shaw et al. |
| 5,978,855 A | 11/1999 | Metz et al. |
| 6,072,810 A | 6/2000 | Van der Puttel et al. |
| 6,079,041 A | 6/2000 | Kunisa et al. |
| 6,407,993 B1 | 6/2002 | Moulsley |
| 6,493,402 B1 | 12/2002 | Fimoff |
| 6,559,894 B2 | 5/2003 | Omura et al. |
| 6,563,436 B2 | 5/2003 | Fimoff et al. |
| 6,614,847 B1 | 9/2003 | Das et al. |
| 6,625,775 B1 | 9/2003 | Kim |
| 6,687,310 B1 | 2/2004 | Bretl et al. |
| 6,714,563 B1 | 3/2004 | Kushi |
| 6,721,771 B1 | 4/2004 | Chang |
| 6,725,411 B1 | 4/2004 | Gerlach et al. |
| 6,734,920 B2 | 5/2004 | Ghosh et al. |
| 6,754,170 B1 | 6/2004 | Ward |
| 6,762,698 B2 | 7/2004 | Bretl et al. |
| 6,765,508 B2 | 7/2004 | Bretl et al. |
| 6,771,197 B1 | 8/2004 | Yedidia et al. |
| 6,772,184 B2 | 8/2004 | Chang |
| 6,806,816 B2 | 10/2004 | Fimoff |
| 6,823,489 B2 | 11/2004 | Wittig et al. |
| 6,851,085 B2 | 2/2005 | Kim et al. |
| 6,861,964 B2 | 3/2005 | Breti et al. |
| 6,865,712 B2 | 3/2005 | Becker et al. |
| 6,924,753 B2 | 8/2005 | Bretl et al. |
| 6,985,092 B2 | 1/2006 | Bretl et al. |
| 6,987,543 B1 | 1/2006 | Mogre et al. |
| 6,996,133 B2 | 2/2006 | Bretl et al. |
| 7,006,566 B2 | 2/2006 | Birru |
| 7,016,409 B2 | 3/2006 | Unger |
| 7,042,908 B1 | 5/2006 | Mayer |
| 7,042,949 B1 | 5/2006 | Omura et al. |
| 7,046,694 B2 | 5/2006 | Kumar |
| 7,085,324 B2 | 8/2006 | Choi et al. |
| 7,110,048 B2 | 9/2006 | Weiss |
| 7,187,698 B2 | 3/2007 | Bretl et al. |
| 7,194,047 B2 | 3/2007 | Strolle et al. |
| 7,197,685 B2 | 3/2007 | Limberg |
| 7,203,165 B1 | 4/2007 | Kowalewski |
| 7,215,714 B2 | 5/2007 | Bretl et al. |
| 7,260,109 B1 | 8/2007 | Ovard et al. |
| 7,337,386 B2 | 2/2008 | Chang et al. |
| 7,346,107 B2 | 3/2008 | Choi et al. |
| 7,620,074 B2 | 11/2009 | Yasuda et al. |
| 7,675,994 B2 | 3/2010 | Gaddam et al. |
| 7,712,011 B2 * | 5/2010 | Kim et al. ............... 714/784 |
| 7,715,491 B2 | 5/2010 | Yu et al. |
| 7,822,139 B2 * | 10/2010 | Simon ............... 375/265 |
| 7,860,128 B2 * | 12/2010 | Niu et al. ............. 370/474 |
| 7,933,365 B2 | 4/2011 | Choi et al. |
| 7,983,354 B2 * | 7/2011 | Park et al. ............. 375/268 |
| 8,054,842 B2 | 11/2011 | De Heer et al. |
| 8,094,727 B2 | 1/2012 | Hong et al. |
| 8,149,939 B2 * | 4/2012 | Limberg ............. 375/265 |
| 8,151,174 B2 | 4/2012 | Betts |
| 8,374,126 B2 | 2/2013 | Kitaji et al. |
| 8,495,695 B2 | 7/2013 | Kim et al. |
| 8,553,723 B2 | 10/2013 | Clerget et al. |
| 2001/0024457 A1 | 9/2001 | Barry et al. |
| 2001/0050926 A1 | 12/2001 | Kumar |
| 2001/0055342 A1 | 12/2001 | Fimoff |
| 2002/0027947 A1 | 3/2002 | Kanterakis et al. |
| 2002/0040460 A1 | 4/2002 | Choi et al. |
| 2002/0053049 A1 | 5/2002 | Shiomoto et al. |
| 2002/0054634 A1 | 5/2002 | Martin et al. |
| 2002/0154247 A1 | 10/2002 | Ghosh et al. |
| 2002/0154248 A1 | 10/2002 | Wittig et al. |
| 2002/0172275 A1 | 11/2002 | Birru |
| 2002/0181581 A1 | 12/2002 | Birru et al. |
| 2002/0191712 A1 | 12/2002 | Gaddam et al. |
| 2002/0194570 A1 | 12/2002 | Birru et al. |
| 2003/0012290 A1 | 1/2003 | Fimoff et al. |
| 2003/0021341 A1 * | 1/2003 | Vigil et al. ............. 375/240.01 |
| 2003/0039318 A1 | 2/2003 | Tong et al. |
| 2003/0041256 A1 | 2/2003 | Wee et al. |
| 2003/0081692 A1 | 5/2003 | Kwan et al. |
| 2003/0099303 A1 | 5/2003 | Birru et al. |
| 2003/0103575 A1 | 6/2003 | Birru et al. |
| 2003/0108129 A1 | 6/2003 | Voglewede et al. |
| 2003/0112879 A1 | 6/2003 | Antia et al. |
| 2003/0128746 A1 | 7/2003 | Lerner et al. |
| 2003/0140345 A1 | 7/2003 | Fisk et al. |
| 2003/0154441 A1 | 8/2003 | Nieminen |
| 2003/0227906 A1 | 12/2003 | Hallman |
| 2003/0227913 A1 | 12/2003 | Hallman et al. |
| 2003/0227943 A1 | 12/2003 | Hallman |
| 2004/0047367 A1 | 3/2004 | Mammen |
| 2004/0090997 A1 | 5/2004 | Choi et al. |
| 2005/0002416 A1 | 1/2005 | Belotserkovsky et al. |
| 2005/0018691 A1 | 1/2005 | Riedl et al. |
| 2005/0059436 A1 | 3/2005 | Addy et al. |
| 2005/0138521 A1 | 6/2005 | Suzuki et al. |
| 2005/0152411 A1 | 7/2005 | Breti et al. |
| 2005/0160347 A1 | 7/2005 | Kim et al. |
| 2005/0180369 A1 | 8/2005 | Hansen et al. |
| 2005/0184887 A1 | 8/2005 | Jaffe et al. |
| 2005/0193408 A1 | 9/2005 | Sull et al. |
| 2005/0193425 A1 | 9/2005 | Sull et al. |
| 2005/0203927 A1 | 9/2005 | Sull et al. |
| 2005/0204385 A1 | 9/2005 | Sull et al. |
| 2005/0210145 A1 | 9/2005 | Kim et al. |
| 2005/0276259 A1 | 12/2005 | Nakabayashi et al. |

(56) References Cited

U.S. PATENT DOCUMENTS

| | | | |
|---|---|---|---|
| 2006/0045191 A1 | 3/2006 | Vasanth et al. | |
| 2006/0064716 A1 | 3/2006 | Sull et al. | |
| 2006/0104348 A1 | 5/2006 | Chen et al. | |
| 2006/0140301 A1 | 6/2006 | Choi et al. | |
| 2006/0212782 A1 | 9/2006 | Li | |
| 2006/0212902 A1 | 9/2006 | Seo et al. | |
| 2006/0244865 A1 | 11/2006 | Simon | |
| 2006/0246836 A1 | 11/2006 | Simon | |
| 2006/0253890 A9 | 11/2006 | Park et al. | |
| 2007/0002871 A1 | 1/2007 | Pekonen et al. | |
| 2007/0025450 A1 | 2/2007 | Jin et al. | |
| 2007/0076584 A1 | 4/2007 | Kim et al. | |
| 2007/0076586 A1 | 4/2007 | Kim et al. | |
| 2007/0094567 A1* | 4/2007 | Park et al. | 714/753 |
| 2007/0116152 A1 | 5/2007 | Thesling | |
| 2007/0140271 A1 | 6/2007 | Amante et al. | |
| 2007/0140369 A1 | 6/2007 | Limberg | |
| 2007/0153914 A1 | 7/2007 | Hannuksela et al. | |
| 2007/0168844 A1 | 7/2007 | Jeong et al. | |
| 2007/0183525 A1 | 8/2007 | Park et al. | |
| 2007/0195889 A1 | 8/2007 | Hong et al. | |
| 2007/0211661 A1 | 9/2007 | Tee et al. | |
| 2007/0211671 A1 | 9/2007 | Cha | |
| 2007/0211769 A1* | 9/2007 | Lee et al. | 370/535 |
| 2007/0230564 A1 | 10/2007 | Chen et al. | |
| 2007/0230607 A1* | 10/2007 | Yu et al. | 375/265 |
| 2007/0256001 A1 | 11/2007 | Suzuki et al. | |
| 2007/0277210 A1 | 11/2007 | Yousef | |
| 2008/0002765 A1 | 1/2008 | Song et al. | |
| 2008/0101493 A1 | 5/2008 | Niu et al. | |
| 2008/0112502 A1 | 5/2008 | Limberg | |
| 2008/0273619 A1 | 11/2008 | Kim et al. | |
| 2009/0044230 A1 | 2/2009 | Oh et al. | |
| 2009/0128711 A1 | 5/2009 | Kim et al. | |
| 2010/0226443 A1* | 9/2010 | Citta et al. | 375/240.26 |
| 2010/0231803 A1* | 9/2010 | Citta et al. | 348/723 |
| 2010/0232495 A1* | 9/2010 | Citta et al. | 375/240.01 |
| 2010/0238995 A1* | 9/2010 | Citta et al. | 375/240.01 |
| 2010/0246663 A1* | 9/2010 | Citta et al. | 375/240.01 |
| 2010/0246664 A1* | 9/2010 | Citta et al. | 375/240.01 |
| 2010/0299699 A1* | 11/2010 | Citta et al. | 725/32 |
| 2010/0329328 A1 | 12/2010 | Kontola et al. | |

FOREIGN PATENT DOCUMENTS

| | | |
|---|---|---|
| CN | 1575549 | 2/2005 |
| CN | 1757190 | 4/2006 |
| CN | 1954607 | 4/2007 |
| EP | 0822722 | 2/1998 |
| EP | 0853407 | 7/1998 |
| EP | 0999709 | 5/2000 |
| EP | 1056236 | 11/2000 |
| EP | 1237319 A1 | 9/2002 |
| EP | 1276288 A1 | 1/2003 |
| EP | 1437910 | 7/2004 |
| EP | 1528702 | 5/2005 |
| EP | 1533727 | 5/2005 |
| EP | 1657835 | 5/2006 |
| EP | 1693981 | 8/2006 |
| FI | 990250 | 8/2000 |
| JP | 08237614 | 9/1996 |
| JP | 9005352 | 1/1997 |
| JP | 9224224 | 8/1997 |
| JP | 11196072 | 7/1999 |
| JP | 2001274774 | 10/2001 |
| JP | 200432467 | 1/2004 |
| JP | 2004519952 | 7/2004 |
| JP | 2004-328356 A | 11/2004 |
| JP | 2004328356 A2 | 11/2004 |
| JP | 2005328334 | 11/2005 |
| JP | 2005328397 | 11/2005 |
| JP | 2006515964 | 6/2006 |
| JP | 2007-214856 A | 8/2007 |
| JP | 2007214856 A2 | 8/2007 |
| JP | 2009524944 | 7/2009 |
| KR | 100277764 | 1/2001 |
| KR | 20010087406 | 9/2001 |
| KR | 20020027293 | 4/2002 |
| KR | 20060057266 | 5/2006 |
| KR | 20080092195 | 10/2008 |
| WO | WO9851111 | 11/1998 |
| WO | WO0018055 | 3/2000 |
| WO | WO0035136 | 6/2000 |
| WO | WO0048052 | 8/2000 |
| WO | 00/74375 A1 | 12/2000 |
| WO | WO0074375 | 12/2000 |
| WO | WO0191407 | 11/2001 |
| WO | WO 02/21784 A1 | 3/2002 |
| WO | WO02080559 | 10/2002 |
| WO | WO02093754 | 11/2002 |
| WO | WO02100026 | 12/2002 |
| WO | WO2004015998 | 2/2004 |
| WO | WO2004/023818 A1 | 3/2004 |
| WO | WO2004062183 | 7/2004 |
| WO | WO2005/020576 A1 | 3/2005 |
| WO | WO2005076218 | 8/2005 |
| WO | WO2005115001 | 12/2005 |
| WO | WO2005122574 | 12/2005 |
| WO | 2006001635 A1 | 1/2006 |
| WO | WO2006104519 | 10/2006 |
| WO | WO2006126841 | 11/2006 |
| WO | WO2007/024275 | 3/2007 |
| WO | WO2007046674 | 4/2007 |
| WO | WO2007046677 | 4/2007 |
| WO | WO2007099978 | 7/2007 |
| WO | WO2008/014522 A2 | 1/2008 |
| WO | WO2008/144001 A1 | 11/2008 |
| WO | WO2008/144002 A2 | 11/2008 |
| WO | WO2008/144003 A1 | 11/2008 |
| WO | WO2008/144004 A1 | 11/2008 |
| WO | WO2008/144005 A1 | 11/2008 |

OTHER PUBLICATIONS

Henderson John G.N. Et Ali: "ATSC DTV Receiver Implementation", Proceedings of the IEEE, vol. 94, No. 1. pp. 119-147, Jan. 2006.

Citta, Richard et al : ATSC Transmission System: VSB Tutorial, Symposium Handouts, Montreuz Symposium, Jun. 12, 1997 pp. 1-17.

Wu, Yiyan et al: "An ATSC DTV Receiver With Improved Robustness to Multipath and Distributed Transmission Environments", IEEE Transactions on Consumer Electronics, vol. 50, No. 1, pp. 32-41, Mar. 2004.

Park, Eui Jun et al: "Supplementary Reference Sequence VSB System", Consumer Electronics 2007; Digest of Technical Papers Publication Jan. 10-14, 2007, pp. 1-2.

Kim, Seung-Won et al: "Enhanced-x VSB System Development for Mobile/Portable Reception"; IEEE Transactions on Consumer Electronics, Published May 2005, Issue 2, pp. 419-423.

Bretl, Wayne et al: ATSC RF, Modulation, and Transmission, Proceedings of the IEEE, Issue 1, Jan. 2006, pp. 44-59.

Malinowski, Simon et al: Synchronization Recovery and State Model Reduction for Soft Decoding of Variable Length Codes, ieee transactions on information theory, Published Jan. 2007, vol. 53, Issue 1, pp. 368-377.

Zhong, Yang et al: 64 QAM Trellis Decoding With Channel State Information, Published in ASICON 2001, 4$^{th}$ International Conference on ASIC Proceedings, pp. 420-423, IEEE, Piscataway, NJ.

Search Report dated Nov. 2, 2009.

Sun et al.:"Global Motion Vector Coding (GMVC)," ITU-Telecommunication Standardization Sector, doc. VCEG-O20, Dec. 4, 2001, pp. 1-6.

ATSC STD., "A/53: ATSC Digital Television Standard, Parts 1-6, 2007," Advanced Television Systems Committee, Inc., Jan. 3, 2007, 136 pages.

"ATSC Digital Television Standard, Doc. A/53," ATSC Digital Television Standard, Apr. 12, 1995, pp. 1-74.

"ATSC Digital Television Standard Part 2—RF/Transmission System Characteristics (A/53, Part 2:2007)," Online Document A/53, Part 2:2007, Jan. 3, 2007, pp. 1-44.

(56) References Cited

OTHER PUBLICATIONS

DAVIC, "Lower Layer Protocols and Physical Interfaces", Digital Audio-Visual Council, DAVIC 1.3.1 Specification Part 8, 1998.
Delay, "Broadband Data Delivery Over Television Networks", Digital and Computational Video, Proceedings, Feb. 8-9, 2001, Piscataway, NJ, pp. 36-43.
Digital Video Broadcasting, "DVB-H Implementation Guidelines", DVB Document A092 Rev. 2, May 2007.
ISO/IEC 13818-1, "Transport Stream Packet Layer", ITU-T Rec. H.222.0, 1996.
Jacobsmeyeter, "Introduction to Error-Control Coding", Pericle Communications Col, Internet Article.
Kratochvil et al., "DVB-H Standard and Testing of its Mobile Terminals," Radioelektronika, 17th International Conference, Brno, Czech Republic, Apr. 24-25, 2007, IEEE Apr. 24, 2007, pp. 292-296.
Roweis, "Equivalent Codes & Systematic Forms", Internet Article, Nov. 9, 2005.
Seshadri et al., "Channel Coding for Cochannel Interference Suppresion in Wireless Communication Systems", Internet Article, Retrieved on Sep. 9, 2008.
Simpson, "Video Over IP, A Practical Guide to Technology and Applications", Elsevier-Focal Press, 2006, pp. 259-265.
Tang et al., "Viterbi Decoder for High-Speed Ultra-Wideband Communication Systems", ICASSP 2005, 2005 IEEE.
De Castro, Fernando CC, et al. "8-VSB channel coding analysis for DTV broadcsat." Consumer Electronics, IEEE Transactions on 46.3 (2000): 539-547.
ATSC "ATSC Recommended Practice: Proram and System Information Protocol Implementation Guidelines for Broadcasters," ATSC, Jun. 25, 2002, pp. 1-44.
ATSC "ATSC Recommended Practice: Program and System Information Protocol Implementation Guidelines for Broadcasters," ATSC, Jun. 25, 2002, pp. 45-93.
Clark et al., "Error Correction Coding for Digital Communications," Plenum Publishing Corporation, 1981, Chapter 2, Group Code pp. 50-61.
3rd Generation Partnership Project (3GPP); Telechnical Specification Group Radio Access Network Multiplexing and Chemical Coding (FDD) Oct. 1, 1999, pp. 12-13.
Max, Sebastien, et al, "OFDM-UWB Physical Layer Emulation for Event-Based MAC Simulation," Personal Indoor and Mobile Radio Communications, 17th Int'l Symposium on IEEE, Sep. 1, 2006, p.
(U.S. Appl. No. 12/599,355) Non-final rejection dated Sep. 12, 2013.
(U.S. Appl. No. 12/599,391) Final Rejection dated Sep. 9, 2013.
(U.S. Appl. No. 12/682,985) Final Rejection dated Jun. 20, 2013.
(U.S. Appl. No. 12/599,391) Non-final rejection dated May 7, 2013.
(U.S. Appl. No. 12/733,961) Final Rejection dated Jan. 14, 2013.
(U.S. Appl. No. 12/734,149) Final Rejection dated Dec. 20, 2012.
(U.S. Appl. No. 12/682,985) Non-final Rejection dated Oct. 1, 2012.
(U.S. Appl. No. 12/599,355) Final Rejection dated Sep. 13, 2012.
(U.S. Appl. No. 12/599,757) Final rejection dated Aug. 2, 2012.
(U.S. Appl. No. 12/599,734) Final Rejection dated Jun. 21, 2012.
(U.S. Appl. No. 12/733,961) Non-final Rejection dated Mar. 2, 2012.
(U.S. Appl. No. 12/599,734) Non-final Rejection Feb. 1, 2012.
(U.S. Appl. No. 12/599,757) Non-final Rejection dated Dec. 23, 2011.
WO Search Report for U.S. Appl. No. 12/734,154 dated Feb. 17, 2010.
WO Search Report for U.S. Appl. No. 12/733,961 dated Dec. 15, 2009.
WO Search Report for U.S. Appl. No. 12/682,985 dated Nov. 27, 2009.
WO Seach Report for U.S. Appl. No. 12/734,149 dated Sep. 11, 2009.
WO Search Report for U.S. Appl. No. 12/599,355 dated Oct. 7, 2008.
WO Search Report for PCT/US08/006335 dated Oct. 7, 2008.
WO Search Report for U.S. Appl. No. 12/599,391 dated Oct. 7, 2008.
WO Search Report for U.S. Appl. No. 12/599,734 dated Oct. 7, 2008.
(U.S. Appl. No. 12/599,757) Non-Final Rejection dated Sep. 27, 2013.
WO Search Report for U.S. Appl. No. 12/599,757 dated Oct. 7, 2008.
(U.S. Appl. No. 12/599,355) Non-Final Rejection dated Apr. 19, 2012.
(U.S. Appl. No. 12/734,149) Non-final Rejection dated Apr. 6, 2012.
Lehtoranta et al.: "Detecting Corrupted Intra Macroblocks in H.263 Video,"IEEE, 2002, pp. 33-36.
"Generalized Parity Check Codes," 1981, pp. 50-61.
Morigana et al, "New Concepts and Technologies for Achieving Highly reliable and high-capacity multimedia wireless communications systems," IEEE Comm Magazine, vol. 35 No. 1, Jan. 2007.
EP Search Report for EP14164486 dated Aug. 5, 2014.
U.S. Appl. No. 12/599,391 Restriction Requirement dated Feb. 20, 2013.
U.S. Appl. No. 12/599,391 Notice of Allowance dated Feb. 19, 2014.
U.S. Appl. No. 12/599,391 Corrected Notice of Allowability dated Sep. 3, 2014.
U.S. Appl. No. 12/599,734 Non-Final Office Action dated Dec. 7, 2011.
U.S. Appl. No. 12/599,734 Notice of Allowability dated Nov. 27, 2013.
U.S. Appl. No. 12/599,734 Notice of Allowability dated Sep. 4, 2014.
U.S. Appl. No. 12/599,757 Notice of Allowance dated Jan. 27, 2014.
U.S. Appl. No. 12/599,757 Corrected Notice of Allowability dated Aug. 28, 2014.
U.S. Appl. No. 12/682,985 Non-Final OA dated Dec. 30, 2013.
U.S. Appl. No. 12/682,985 Notice of Allowance dated May 13, 2014.
U.S. Appl. No. 12/682,985 Corrected Allowability dated Sep. 5, 2014.
U.S. Appl. No. 12/734,149 Office Action dated Mar. 27, 2014.
U.S. Appl. No. 12/734,149 Notice of Allowance dated Aug. 18, 2014.
U.S. Appl. No. 12/734,149 NOA dated Aug. 18, 2014.
Notice of Allowance for U.S. Appl. No. 12/734,149 dated Mar. 2, 2015.
Chinese Search Report for related CN Application No. 2008800161398 dated Jan. 24, 2013.
CN Search Report for related CN Application No. CN200880111809.4 dated Jun. 24, 2013.
CN Search Report for related CN Application No. 200880111809.4 dated Feb. 13, 2012.
CN Search Report for related CN Application No. CN 200880016135.X dated Dec. 4, 2013.
CN Search Report for related CN Application No. CN200880016135X dated Jun. 28, 2013.
CN Search Report for related CN Application No. 200880016135.X dated Oct. 15, 2012.
CN Search Report for related CN Application No. 2008801118075 dated Aug. 2, 20121.

\* cited by examiner

PREAMBLE FOR A DIGITAL TELEVISION SYSTEM

This application claims the benefit, under 35 U.S.C. §365 of International Application PCT/US2008/011711, filed Oct. 14, 2008 which was published in accordance with PCT Article 21(2) on Apr. 23, 2009 in English and which claims the benefit of U.S. provisional patent application No. 60/998,978 filed Oct. 15, 2007; provisional patent application No. 60/998,961 filed on Oct. 15, 2007; provisional patent application No. 60/999,040 filed on Oct. 15, 2007; provisional patent application No. 61/190,499 filed on Aug. 29, 2008; provisional patent application No. 61/190,516 filed on Aug. 29, 2008 and provisional patent application No. 61/190,517 filed on Aug. 29, 2008

The present invention generally relates to a method and apparatus for utilizing preamble packets in a digital television signal stream. The method and apparatus are particularly suitable for the transmission of digital television signals to mobile and/or handheld portable devices capable of receiving digital television signals (hereinafter called "M/H receivers") while maintaining backward compatibility with an existing digital television system, such as the one that complies with the ATSC A/53 digital television standard utilized in the United States. The term "M/H receivers" includes but not limited to portable television receivers, vehicular television receivers, cellular telephones, intelligent phones, laptop computers, and personal data assistants. The present invention also relates to a method and apparatus suitable for the reception of the digital television signals including the preamble packets.

Over the past decades, television broadcast transmission systems have migrated from analog to digital form. For example, in the United States, the Advanced Television Standards Committee (ATSC) developed a standard called "ATSC Standard: Digital Television Standard A/53" (ATSC A/53 standard) to replace the existing analog broadcast television system. The ATSC A/53 standard provides how data for digital television broadcasts should be encoded and decoded.

Furthermore, the ATSC A/53 standard defines how source data (e.g., digital audio and video data) should be processed and modulated into a signal to be transmitted over the air. In particular, the redundant information is added to the source data so that a receiver may recover the source data properly even under undesirable noises and/or multi-path interference conditions. Although the redundant information reduces the effective rate at which the source data is transmitted, such information increases the potential for successful recovery of the source data from a signal received.

The ATSC A/53 standard was developed primarily for high definition television (HDTV) reception at a fixed location (e.g., in a home). That is, the system was designed to maximize video bit rate for the television receivers with high resolution screens that were already beginning to enter the market. As a result, broadcast transmissions under the ATSC A/53 standard present difficulties for mobile reception. Enhancements to the standard are necessary for the rugged or robust reception of digital television signals by M/H receivers.

Recognizing this issue, in 2007 the ATSC announced the launch of a process to develop a new standard, called as the "ATSC-M/H standard," for the effective transmission of digital television signals to M/H receivers. One of the requirements to the ATSC-M/H standard is to maintain backward compatibility with the existing legacy ATSC A/53 broadcast system so that the contents to be received by M/H receivers may be transmitted along with the legacy ATSC signal within the same 6 MHz transmission channel.

Some of the proposed transmission systems for the ATSC-M/H standard perform a periodic or burst transmission by periodically replacing portions of the continuous data stream normally provided by the legacy A/53 transmission system. The periodic mode transmission systems often add preambles to its data stream in order to assist the receiving system in overcoming the adverse effects caused by the transmission channel, such as noises, multipath interference, etc. The preambles typically include known or predetermined information to be used by receivers for training to improve their reception. For example, the preambles provide training knowledge for the equalizer circuit of M/H receivers. Thus, the proper use of the preambles may be useful particularly under severe receiving conditions, such as those found in mobile reception.

Although the preambles could improve the reception of digital television signals, it is noted that the digital television transmission system, capable of broadcasting both new periodic and legacy continuous television data, may face an additional problem. That is, the preambles included in the periodic data stream may be subject to the subsequent alternation by the legacy A/53 transmission circuit. This is because the periodic data stream, including the preambles, is provided to the legacy A/53 transmission encoder as an input signal in order to satisfy the backward compatibility between the new ATSC-M/H and the existing legacy A/53 transmission signals.

More specifically, an ATSC encoder, also know as an A/53 encoder or an 8-VSB encoder, used in the legacy ATSC television system typically includes a data randomizer, a Reed Solomon encoder, a byte interleaver, and a trellis encoder. The operation of ATSC encoder alters the content, location, and duration of the preamble information, created by the preceding ATSC-M/H transmission system, resulting in undesirable modification and spreading of the preamble information. This makes it difficult for M/H receivers to recover the preambles.

Second, in general, the training function of preambles becomes most effective if a preamble is provided at a certain predetermined time interval during transmission. Effective timing for the insertion of the preambles is necessary to minimize the adverse effect caused by the byte interleaver of the legacy ATSC decoder.

Third, the periodic insertion of M/H data in a legacy ATSC data stream creates a problem of restoring the correct trellis coding path by receivers. Since trellis coding relies on a "coding path," a trellis decoder needs to keep track of past results. Furthermore, since the trellis encoding is done in the ATSC encoder over the interleaved data stream that includes both M/H and legacy A/53 data, it would be difficult for a receiver to track back the correct trellis coding path efficiently if the receiver is designed to receive only one of the new M/H and legacy ATSC signals.

Accordingly, there is a need for a method and apparatus that solves each one of the aforementioned problems. The present invention addresses these and/or other issues.

In accordance with an aspect of the present invention, a method is disclosed. According to an exemplary embodiment, the method comprises receiving a stream of data packets, inserting a plurality of preamble packets into the stream of data packets prior to an interleaving of the resulting stream of data packets using convolutional interleaving, and the number of preamble packets is selected to correspond to the maximum delay of said convolutional interleaving.

In accordance with another aspect of the present invention, an apparatus is disclosed. According to an exemplary embodiment, the apparatus comprises means such as a receiving point for receiving a stream of data packets, means such as a preamble packet inserter for inserting a plurality of preamble packets into the stream of data packets prior to interleaving the resulting stream of data packets using interleaving means such as a convolutional interleaver, the interleaving means interleaves the resulting stream of data packets using convolutional interleaving, and the number of preamble packets inserted by the inserting means is selected to correspond to the maximum delay introduced by the interleaving means.

In accordance with another aspect of the present invention, a method is disclosed. According to an exemplary embodiment, the method comprises receiving field synchronization data, receiving trellis-encoded interleaved training data, and using the field synchronization data and a portion of the trellis-encoded interleaved training data for synchronization of a receiver.

In accordance with another aspect of the present invention, an apparatus is disclosed. According to an exemplary embodiment, the apparatus comprises means such as receiver circuitry for receiving field synchronization data, means such as synchronization circuitry for receiving trellis-encoded interleaved training data, and means for using the field synchronization data and a portion of the trellis-encoded interleaved training data for synchronization of a receiver.

In accordance with another aspect of the present invention, an apparatus is disclosed. According to an exemplary embodiment, the apparatus comprises means such as a preamble packet inserter for inserting training data into a data stream, means such as an encoder for interleaving and trellis encoding the data stream containing the inserted training data, and means such as a multiplexer for inserting field synchronization data into the interleaved and trellis-encoded data stream, the training data is inserted at a position such that after interleaving and trellis encoding, the field synchronization data is transmitted amidst or adjacent to the trellis encoded interleaved training data in a fixed positional relationship allowing use of the field synchronization data and at least a portion of the training data for synchronization at a receiver.

In accordance with another aspect of the present invention, a method is disclosed. According to an exemplary embodiment, the method comprises receiving trellis-encoded interleaved data, the trellis-encoded interleaved data includes predetermined training data, determining the trellis coding path for the predetermined training data statistically, and trellis decoding the interleaved data based upon the determination.

In accordance with another aspect of the present invention, a method is disclosed. According to an exemplary embodiment, the method comprises receiving trellis-encoded interleaved data, the trellis-encoded interleaved data includes predetermined training data, determining the trellis coding path for the predetermined training data statistically, and trellis decoding the interleaved data based upon the determination; the interleaved data comprises data from a first transmission mode, such as a legacy A/53 transmission, and a second transmission mode, such as an M/H transmission.

In accordance with another aspect of the present invention, an apparatus is disclosed. According to an exemplary embodiment, the apparatus comprises means such as a circuit point for receiving trellis-encoded interleaved data, the trellis-encoded interleaved data includes predetermined training data, and means such as a circuit for determining the trellis coding path for the predetermined training data statistically, the means trellis decodes the interleaved data based upon the determination.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

While this invention has been described as having a preferred design, the present invention can be further modified within the spirit and scope of this disclosure. This application is, therefore, intended to cover any variations, uses, or adaptations of the invention using its general principles. For example, the described technique of preamble design, insertion, decoding, and use in synchronization could be applicable to transmission or reception systems designed for other types of data or that use different coding, error-correction, redundancy, interleaving, or modulation schemes.

Figure 1:
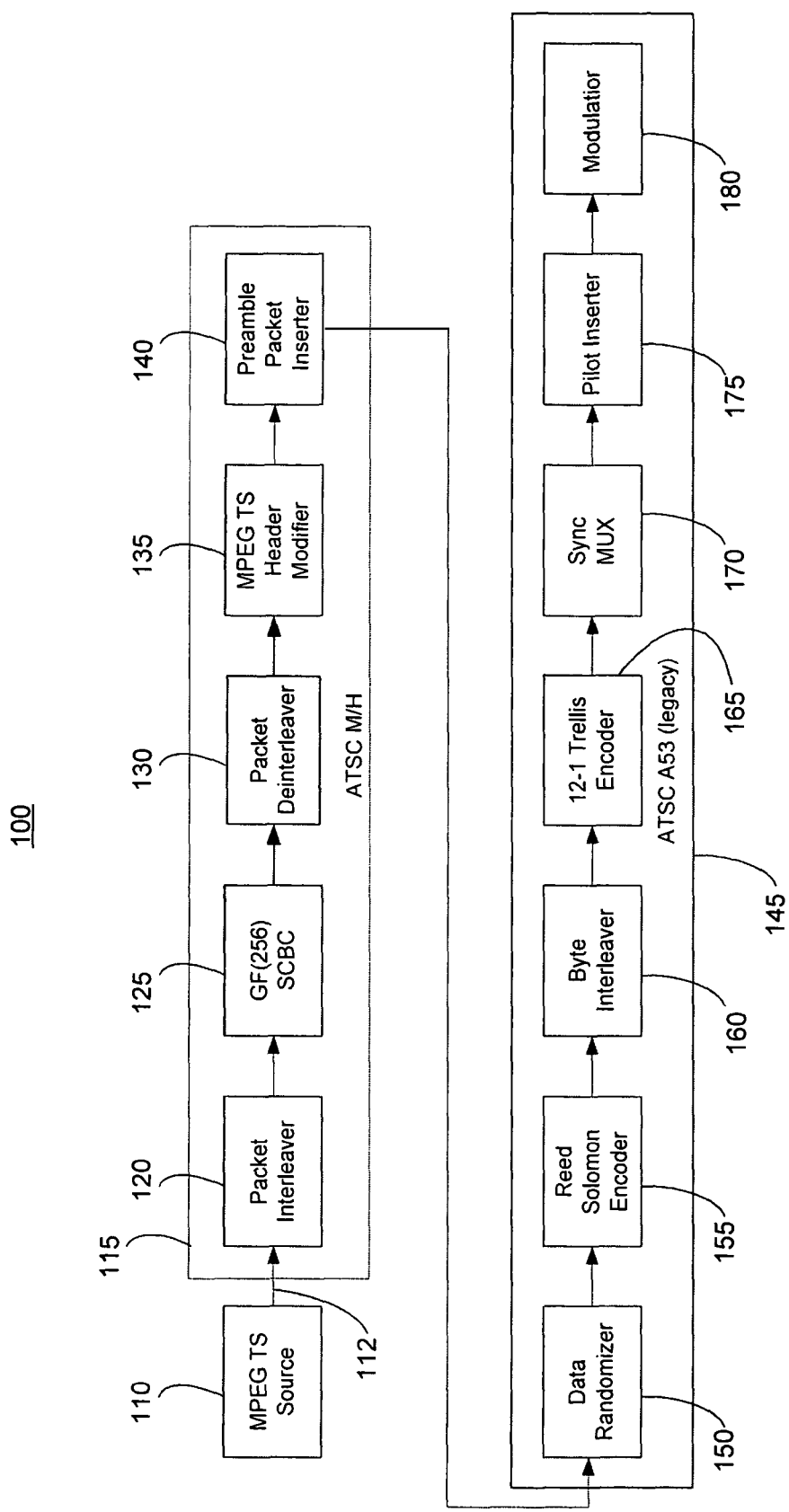
FIG. 1 is a block diagram of a terrestrial broadcast transmitter for mobile/handheld (M/H) reception according to an exemplary embodiment of the present invention.

Referring now to the drawings, and more particularly to FIG. 1, a block diagram of an exemplary ATSC-M/H transmitter 100 is shown. The upper portion of the block diagram depicts exemplary ATSC M/H signal preprocessing block 115 (hereinafter called ATSC "M/H encoder"), and the lower portion of the block diagram depicts exemplary legacy ATSC A/53 signal processing block 145 (hereinafter called ATSC "A/53 encoder"). Legacy ATSC A/53 encoder 145 functions in compliance with the ATSC A/53 standard known to one skilled in the art.

MPEG Transport Stream (TS) Source 110 is coupled to ATSC M/H encoder 115, which contains Packet Interleaver 120, GF(256) Serial Concatenated Block Coder (SCBC) 125, Packet Deinterleaver 130, MPEG TS Header Modifier 135, and Preamble Packets Inserter 140. ATSC M/H encoder 115 processes an incoming data stream to produce a rugged data stream suitable for the reception and use by M/H receivers. The output of ATSC M/H encoder 115 is provided to legacy ATSC A53 encoder 145, which functions in accordance with the ATSC A/53 standard.

Packet Interleaver 120 receives from MPEG TS Source 110 a stream of data arranged in packets. Each packet contains 187 bytes, which includes a three-byte header for packet identification. Packet Interleaver 120 takes the bytes from a sequence of consecutive packets in row-by-row order and outputs them column-by-column. The output of Packet Interleaver 120 is provided to GF(256) SCBC 125. GF(256) SCBC 125 functions to code the packet interleaved data. In the embodiment described herein, GF(256) SCBC 125 is parameterized as a (n, k) systematic linear block code over the Galois Field GF(256)-n is in Bytes and k is in Bytes. The detailed operation of GF(256) will be described below in conjunction with FIG. 3.

The output of GF(256) SCBC 125 is provided to Packet Deinterleaver 130. Packet Deinterleaver 130 takes the block coded output packets in a column-by-column order, and outputs the bytes row-by-row. As a consequence of the particular block code, the original packets are reconstituted and new packets are created from the parity bytes of the SCBC codewords. The output of Packet Deinterleaver 130 is provided to MPEG TS Header Modifier 135.

MPEG TS Header Modifier 135 receives the deinterleaved 187-byte packets. As mentioned earlier, each packet contains a three-byte header. The three bytes include a packet identification (PID), along with several other bits or groups of bits used to convey information regarding the packet. MPEG TS Header Modifier 135 functions to modify certain bits in the header portions of the ATSC M/H packets so that legacy ATSC receivers may ignore such packets while also not considering them as corrupt. The output of TS Header Modifier 135 is then provided to Preamble Packet Inserter 140.

Preamble Packet Inserter 140 may place predetermined tracking packets (i.e., preambles) into the rugged data stream. The preamble packets represent packets of predetermined information that are completely or mostly known to the receivers capable of receiving the rugged ATSC-M/H data stream, such as M/H receivers. Such preamble packets are used to assist with convergence in the equalizer portion of an M/H receiver. It is noted that although the predetermined packets are provided to improve reception primarily in M/H receivers, they may also be used to further improve the reception in the ATSC legacy receivers having an optional capability of processing the preamble packets as disclosed herein. It is further noted that the preamble packets may also be used in the M/H receivers to assist in decoding the trellis state created in the legacy ATSC A53 encoder 145 as disclosed herein. The output of Preamble Packet Inserter 140 is provided to legacy ATSC A/53 decoder 145.

Following the ATSC-M/H processing, the stream of data is provided to the legacy ATSC A/53 encoder 145, which includes Data Randomizer 150, Reed-Solomon Encoder 155, Byte Interleaver 160, 12-1 Trellis Encoder 165, Sync Multiplexer 170, Pilot Inserter 175, and Modulator 180 in accordance with the ATSC A/53 standard.

Data Randomizer 150 XORs the incoming ATSC-M/H or ATSC A/53 data bytes with a 16-bit maximum length pseudo random binary sequence (PRBS), which is initialized at the beginning of the data field. After data randomization, Reed-Solomon (RS) coding is performed at Reed-Solomon Encoder 155. The Reed-Solomon coding provides additional error correction potential for receivers with the addition of data to the transmitted stream for error correction.

A convolutional Byte Interleaver 160 interleaves the R-S packet in order to further randomize the data in time. Interleaving is a common technique for dealing with burst errors that may occur during the propagation of broadcast RF signals. Without interleaving, a burst error could have a large impact on one particular segment of the data, thereby rendering that segment uncorrectable. If the data is interleaved prior to transmission, however, the effect of a burst error may effectively be spread across multiple data segments. Rather than large errors being introduced in one localized segment that cannot be corrected, smaller errors may be introduced in multiple segments that are each separately within the correction capabilities of forward error correction, parity bit, or other data integrity schemes. For instance, a common (255, 223) Reed-Solomon code will allow correction of up to 16 symbol errors in each codeword. If the Reed-Solomon coded data is interleaved before transmission, a long error burst is more likely to be spread across multiple codewords after deinterleaving, reducing the chances that more than the correctable 16 symbol errors are present in any particular codeword.

The predetermined tracking packets, which may also be referred to as "preambles," may be generated in a number of ways using known training sequence processes. In a preferred embodiment, the predetermined tracking packet includes a valid header with the remaining bytes generated using a pseudo-random number (PN) generator.

Figure 2:
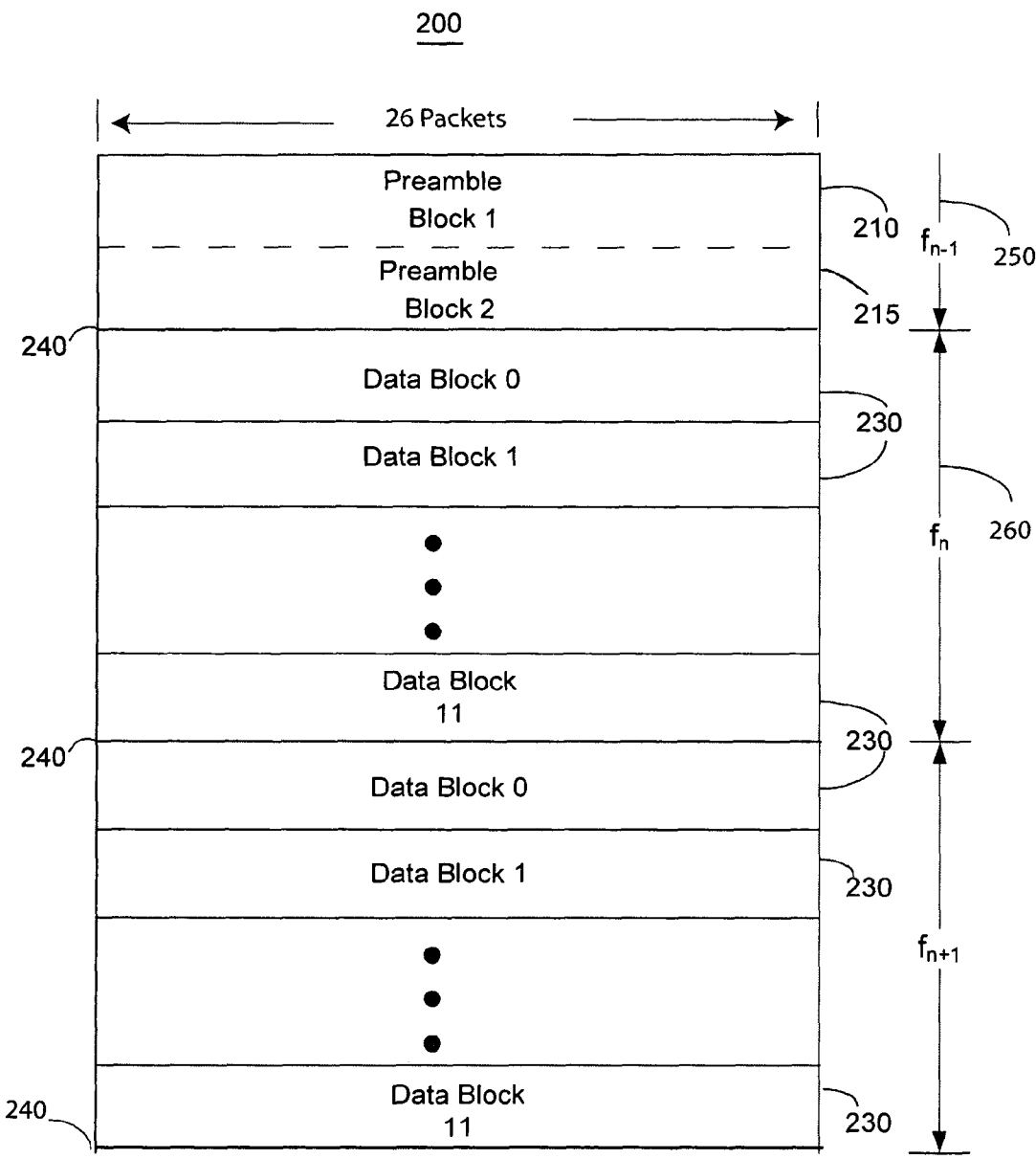
FIG. 2 illustrates a portion of a mobile/handheld (M/H) data stream according to an exemplary embodiment of the present invention.

Referring now to FIG. 2, a portion of ATSC-M/H data stream 200 according to an exemplary embodiment of the present invention is shown. More specifically, FIG. 2 shows how a portion of ATSC-M/H data stream 200 is organized. The stream 200 is made up of bursts having a two-block length of preamble (represented by Blocks 1 and 2) followed by a predetermined number of Data Blocks 230 appropriate for the selected data rate mode. In the described proposal, each Data Block 230 includes 26 MPEG packets. A two-block length of 52 preamble packets 210 and 215 are placed just prior to the effective sync position 240 where a legacy sync data is to be inserted at Sync Multiplexer 170 in FIG. 1. This arrangement establishes a predetermined relationship in the final transmission stream between the preambles inserted at Preamble Packet Inserter 140 and the synchronization data inserted at Sync Multiplexer 170. Although not shown in FIG. 1, a feedback signal is provided from Sync Multiplexer 170 to Preamble Inserter 140 in order to maintain a precise timing between the synchronization data and the preambles.

In the preferred embodiment, Preamble Block 1 (212) starts at the 261st packet. The dotted line between Preamble Block 1 (212) and Preamble Block 2 (215) indicates that a single two-block length (i.e., 52 packets) preamble occupies Preamble Blocks 1 and 2. A control packet included in Data Block 0 in the MPEG-format follows Preamble Block 2, which contains the system information necessary to define the contents of the current ATSC-M/H burst. ATSC-M/H Data Blocks 230 start at the respective ones of the twelve predetermined positions in a field. That is, Data Blocks 0, 1, 2, 3, 4, 5, 6, 7, 8, 9, 10, and 11 start at the first (i.e., packet 0), $27^{th}$ (i.e., packet 26), $53^{rd}$, $79^{th}$, $105^{th}$, $131^{st}$, $157^{th}$, $183^{rd}$, $209^{th}$, $235^{th}$, $261^{st}$, and $287^{th}$ data packet positions, respectively when modulo 12 is employed. Data Blocks 10 and 11 may be used for the preamble data when a preamble is inserted. Lines 240 represent the virtual positions of the field synchronization data, where the synchronizing data is to be inserted at Sync Multiplexer 170 after Byte Interleaver 160 and Trellis Encoder 165 in FIG. 1.

Figure 3:
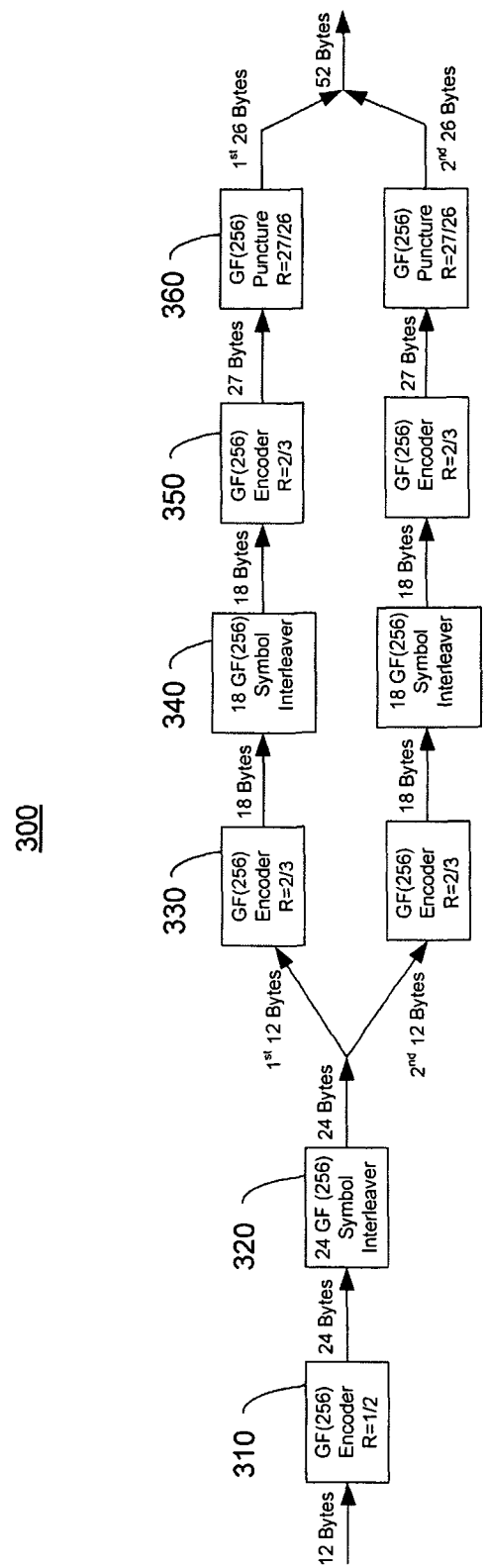
FIG. 3 is a block diagram showing the details of Serial Concatenated Block Code (SCBC) encoder 125 of FIG. 1 according to an exemplary embodiment of the present invention.

Referring now to FIG. 3, Serial Concatenated Block Code encoder 300 according to an exemplary embodiment of the present invention is shown. More specifically, FIG. 3 depicts a block diagram of GF(256) Serial Concatenated Block Coder (SCBC) 125. Here, GF(256) SCBC 125 is adapted to encode the incoming stream of data at the code rate of 12/52. GF(256) SCBC 300 operating under the 12/52 rate mode adds 40 parity bytes to every 12-byte input data. The 12/52 coding path includes GF(256) Encoder (R=1/2) 310, 24GF(256) Symbol Interleaver 320, and two R=12/26 encoding path coupled in parallel for the $1^{st}$ and $2^{nd}$ 12-byte data, respectively. Each 12/26 encoding path includes GF(256) Encoder (R=2/3) 330, 18GF(256) Symbol Interleaver, GF(256) Encoder (R=2/3), and GF(256) Puncture (R=27/26) coupled in series as shown in FIG. 3.

As mentioned above, data redundancy is a key to increase the robustness of the transmission data against the undesirable noises and/or multi-path interference of the transmission channel. One method to introduce redundancy into a transmission stream is to use a block code. In the preferred embodiment disclosed herein, as shown in FIG. 1, the source data packets are interleaved at Packet Interleaver 120, block coded at GF(256) SCBC 125, and then deinterleaved at Packet Deinterleaver 130.

More specifically, GF(256) SCBC 125 encodes the bytes along the columns outputted from Packet Interleaver 120. Packet Deinterleaver 130 receives the encoded stream of codewords produced by GF(256) SCBC 125 and outputs reconstituted rows of 187-byte packets. That is, Packet Deinterleaver 130 inputs the encoded codewords in column by column order, with each column including the redundant bytes added by the processing in GF(256) SCBC 125, and outputs the bytes in a row by row arrangement. In a 12/26 code rate, 26 rows of packets will be output. The interleaving and block coding techniques are employed to produce a deinterleaved stream of the original packets followed by the redundant information coded in separate packets.

Figure 4:
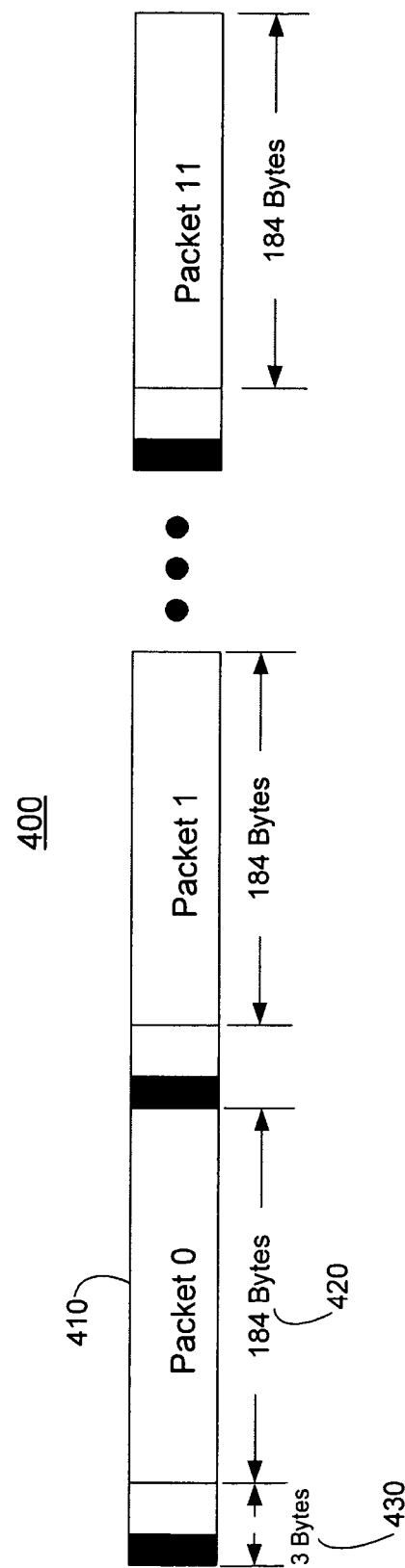
FIG. 4 illustrates a portion of preamble packets according to an exemplary embodiment of the present invention.

Referring now to FIG. 4, a portion of preamble packets 400 according to an exemplary embodiment of the present invention is shown. More specifically, FIG. 4 shows a series of preamble packets made of 12 consecutive MPEG packets 410 (i.e., Packet 0 through Packet 11). These packets are coded with 12/52 rate mode to form two-block length (i.e., 52 packets) preamble 210 shown in FIG. 2.

Each one of the MPEG packets 410 contains 187 bytes, including a 3-byte header 430. As described above, non-header data 420 of each preamble packet is generated from a pseudo-noise (PN) generator, resulting in a total of 2208 bytes of PN data. Pseudo-noise is useful as a content of a preamble since a receiver compares the received preamble data with the data generated by its own PN generator at the receiver end for accuracy.

A three-byte header 430 contains a 13-bit packet identifier (PID) that identifies the packet is part of an M/H transmission. Each header 430 is modified at MPEG TS Header Modifier 135 to contain the PIDs that are unrecognizable by legacy ATSC A/53 receivers. Thus, the legacy receivers may ignore the ATSC-M/H specific data, providing the backward compatibility.

As described above and as shown in FIG. 2, the two-block length preamble is placed between the 261st and 313rd packets in ATSC data field 200 of FIG. 2. ATSC-M/H data packets may be placed in a series of data blocks 230 (i.e., Data Blocks 0-11) following a two-block length preamble (i.e., Preamble Blocks 1 and 2). Furthermore, groups of 26 legacy ATSC A/53 data packets may be inserted in the bursts of ATSC-M/H data blocks. In any event, some of the Data Blocks 230 may contain either 26 ATSC-M/H packets or 26 ATSC A/53 packets.

Referring back to FIG. 1, the preambles are inserted at Preamble Packet Inserter 140 into the stream of encoded packets that includes altered header information. The insertion of the preamble including known or predetermined information improves the performance of M/H receivers as described above.

Figure 5:
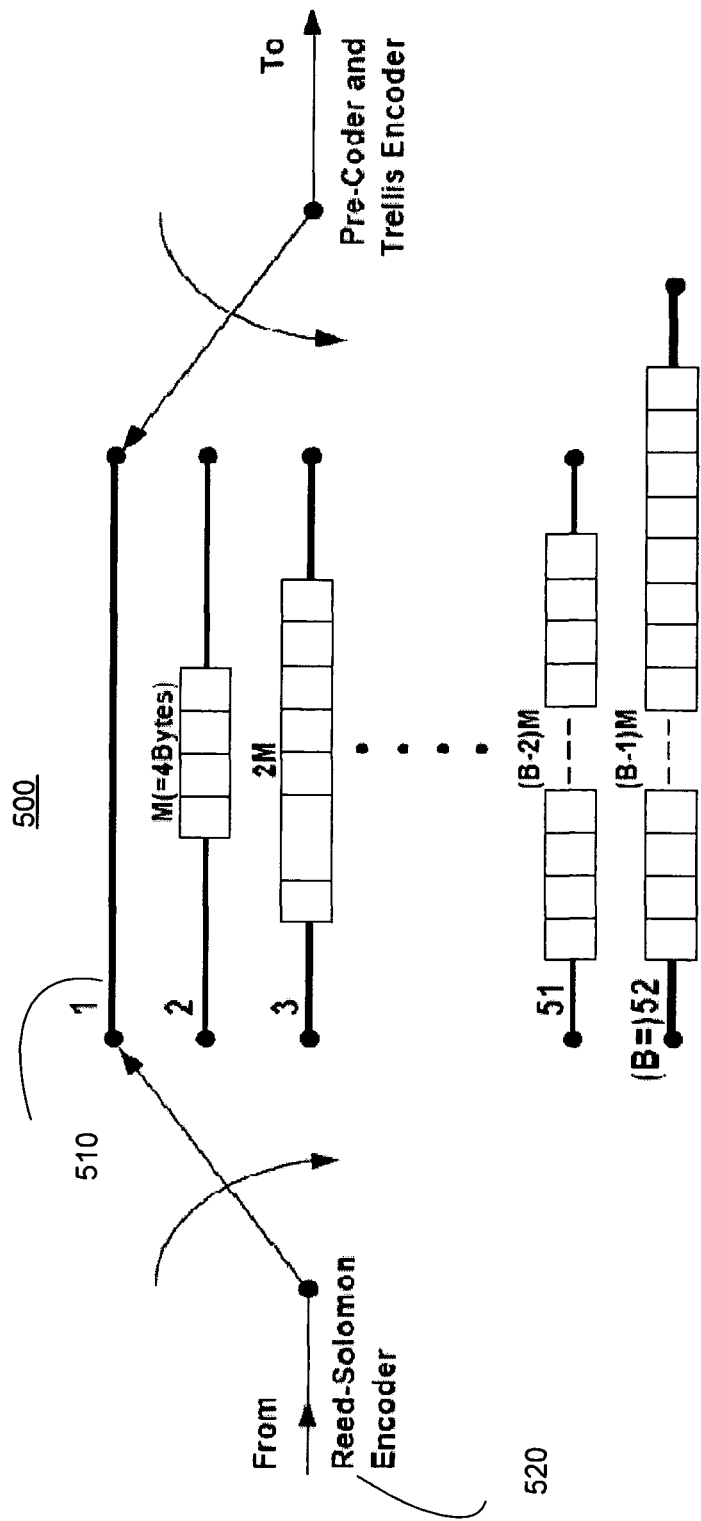
FIG. 5 illustrates the operations of a convolutional interleaver according to conventional art.

Referring now to FIG. 5, a conceptual illustration 500 of the operation of convolutional Byte Interleaver 160 in FIG. 1 is shown. Convolutional Byte Interleaver 160 may be envisioned as a set of (52 in this example) shift registers 510, each has a fixed delay in time. The delays are non-negative integer multiples of a fixed integer m (4 in this example) bytes. In this example, the kth shift register holds (k−1)*4 symbols, where k=1, 2, . . . , 52. The first "shift register" provides no delay. Each new symbol 520 from R-S Encoder 155 feeds into the next shift register. The oldest symbol in that register becomes part of the output data stream.

In addition to introducing a lag in the output data, Byte Interleaver 160 also introduces a spreading of data based upon the delays of the multiple shift registers 510. Like the actual MPEG data, the preamble data inserted prior to Byte Interleaver 160 for the use by M/H receivers become also spread. This makes recovery of the preamble in a receiver for training and/or error evaluation purposes more difficult since it would not be easy for the receiver to reconstruct the widely-spread interleaved data of the preambles.

It is noted that it is possible to reduce the undesirable impact of Byte Interleaver 160 by selecting the length of the preamble properly. On hand, while a shorter preamble may mitigate the undesirable impact of the convolutional interleaving better, such a preamble may also reduce its value for training purposes. On the other hand, while a longer preamble may provide more data for receiver training, such a preamble may be overly difficult to recover due to the convolutional interleaving. Therefore, determining the proper length of the preamble in time is important. Here, the length of the preamble is selected to correspond to the spreading of the preamble by the convolutional interleaver—i.e., to correspond to the maximum delay introduced to the final data symbols of the preamble by the interleaver. For example, as to an exemplary embodiment disclosed herein, the length of each preamble is selected to fifty-two packets, and the maximum delay of the interleaver is fifty two segment.

Figure 6:
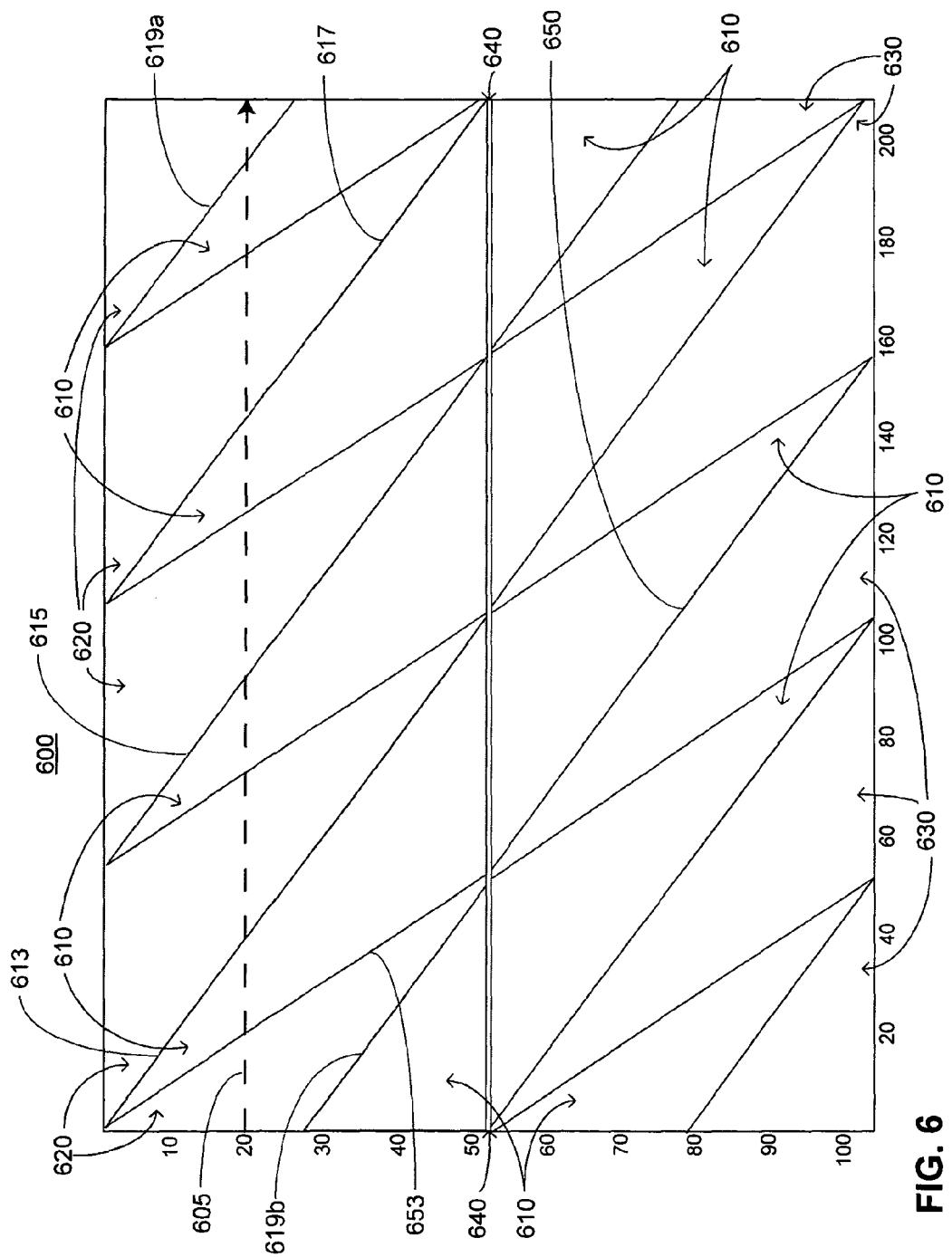
FIG. 6 is a diagram illustrating the positions of data blocks in a transmission frame after the byte interleaving according to an exemplary embodiment of the present invention.

Referring now to FIG. 6, a diagram illustrating locations of data blocks in a transmission frame after Byte Interleaver 160 according to an exemplary embodiment of the present invention is shown. More specifically, the interleaver map 600 illustrates the organization of incoming bytes of data during processing of convolutional Byte Interleaver 160 in FIG. 1. Although, Byte Interleaver 160 may be implemented using a series of delay lines as illustrated in FIG. 5, the interleaver map 600 may be considered as a memory map for the interleaver.

Interleaver map 600 indicates the location of input bytes that are placed or written in and how output bytes are read out. The dimensions of interleaver map 600 are indicated as bytes across the top, numbered from 0 to 206, and the rows of segments along the side from top to bottom, numbered from 0 to 103. Dotted line 605 indicates the order that bytes are read out. For instance, as line 605 represents row 20, all of the bytes in row 20 would be read out, starting with byte 0 and finishing with byte 206. When the last byte, Byte 206, is read out from row 20, the reading advances one row, to row 21, until the last row of the interleaver has been read out. When the last row is read out, the reading begins over with reading the first row (with new packet data).

Line 613 illustrates the location of the first 52 bytes of a 207-byte Reed-Solomon code word, based on reading in those bytes to Byte Interleaver 160. Line 613 starts with the location of byte 0 in the packet and terminates at a center line 640 with the location of byte 51. Lines 615, 617, 619*a*, and 619*b* show the location of the remaining bytes in the first packet. Line 615 starts with the location of byte 52 at the top of the line, and so on, and processes with byte locations for each of lines 615, 617, and 619*a*. The remaining portion of bytes is located along line 619*b* and terminates with byte 206 at a location in a row one row below line 640. The location of bytes in successive packets continues to the left of the locations for the first packet and then process to the portion of the map below line 640 mirroring the procession and locations above line 640. For example, line 650 shows the location of a portion of the bytes for a fifty-second packet (i.e. a packet input 52 packets after the first packet) in Byte Interleaver 160. Line 653 illustrates a boundary line for the transmission of a grouping of packets. With each successive packet, the next successive byte from that packet falls on the boundary line. As a result, line 653 represents the packet 0 byte 0 location, followed by the packet 1 byte 1 location, and so on, to the packet 52 byte 52 location.

The locations of data on the M/H data blocks of FIG. 2 after Byte Interleaver 160 and Sync Multiplexer 170 are described below. It is noted that since the sync data is inserted at Sync. Multiplexer 170 after Byte Interleaver 160, the sync data is not interleaved. FIG. 6 illustrates a sequence of 104 data segments, each represented by one row. In this example, the upper wedge-shaped sections 620 represent the Data Blocks 8 and 9 from field $f_{n-1}$ 250 (i.e., the blocks immediately preceding Preamble Blocks 210 and 215). The lower wedge-shaped sections 630 represent the Data Blocks 0 and 1 from field $f_n$ 260 (i.e., two blocks immediately following Preamble Blocks 210 and 215). The center diamond shaped sections 610 represent two Preamble Blocks 210 and 215 from field $f_{n-1}$ 250. Line 640 represents the sync data to be inserted by Sync Multiplexer 170.

As illustrated in FIG. 6, the final byte of the preamble data will be delayed by approximately 52-data segments due to Byte Interleaver 160. Thus, the data from the two-block length preamble (i.e., 52 packets)—the same amount of data as 52-interleaved data segments—is spread over only within a relatively short range of 104-data segments in the interleaved ATSC A/53 transmission stream. This helps M/H receivers decode the interleaved preamble data within a desirable short period of time. As described above, the promptly decoded preamble data may be used for the improvement of the reception of the M/H digital television signals. To sum up, a proper length of the preamble is important to speed up the signal processing, including decoding, of the preamble information.

It is noticed that the preamble data for M/H receivers may also be used to improve the reception of legacy ATSC A/53 signals if a receiver is designed to decode both A/53 legacy sync data and M/H preamble information. This is because part of the predetermined preamble information along with the legacy sync data, both of which include predetermined information, may be used altogether for receiver training, synchronization, or other purposes. It is noted that in order to utilize both legacy sync data and M/H preamble data, one needs to have a predetermined relationship with the other. More specifically, the pre-interleaved preamble data, inserted at Preamble Packet Inserter 140, needs to have a predetermined timed-relationship with the legacy sync data inserted at Sync Multiplexer 17.

For example, in FIG. 2 the preamble packets are inserted in the data blocks immediately prior to the position 240 where the sync data is to be inserted. FIG. 6 shows that a half of interleaved preamble data 610 is received prior to sync data 640. This may allow synchronization to occur much more quickly than using the A/53 filed sync data alone. As an alternative, for example, the preamble packets may be inserted in the data blocks immediately after the sync data position 240. This would allow the equalizer training by the sync data before the reception of the preamble begins, thereby assisting in preamble reception.

If the synchronization is not achieved with a single segment of ATSC A/53 sync data, a legacy ATSC A/53 receiver using only the sync data alone would be required to wait until the next sync data is received. This is undesirable especially, for example, in a condition where a user rapidly changes the program channels (such as flipping the program channels quickly); a failure to achieve synchronization quickly may run a risk of causing a total failure of achieving synchronization at all. Conversely, an M/H receiver capable of receiving the legacy sync data may be supplemented its training and/or synchronization with the preamble data. In an M/H receiver, portions of the receiving hardware may be designed to shut down between the bursts of M/H data to reduce overall power consumption. Thus, the fast synchronization as power is reapplied to receive each burst is desirable.

Figure 7:
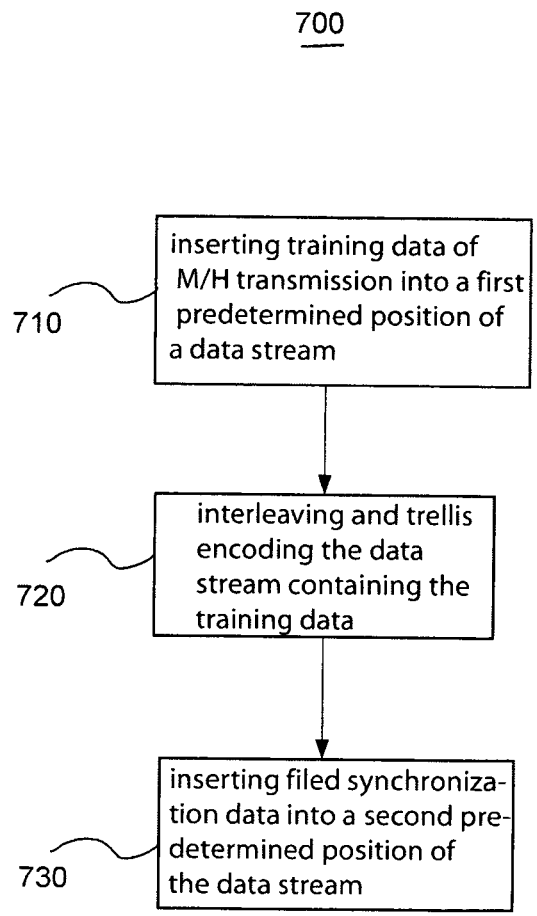
FIG. 7 is a flow chart of a method according to an exemplary embodiment of the present invention.

FIG. 7 is a flowchart describing method 700 according to an aspect of the present invention. The method includes first step 710 of inserting the predetermined training data into a first predetermined position in a data stream. The second step 720 involves interleaving and trellis encoding the data stream containing the inserted training data. The final step 730 includes inserting the field synchronization data into a second predetermined position in the data stream. For example, the first predetermined position may be immediately before or immediately after the second predetermined position with respect to a non-interleaved data as shown in FIG. 2. The second predetermined position may be the one where the legacy sync data is inserted in accordance with the ATSC A/53 standard.

Figure 8:
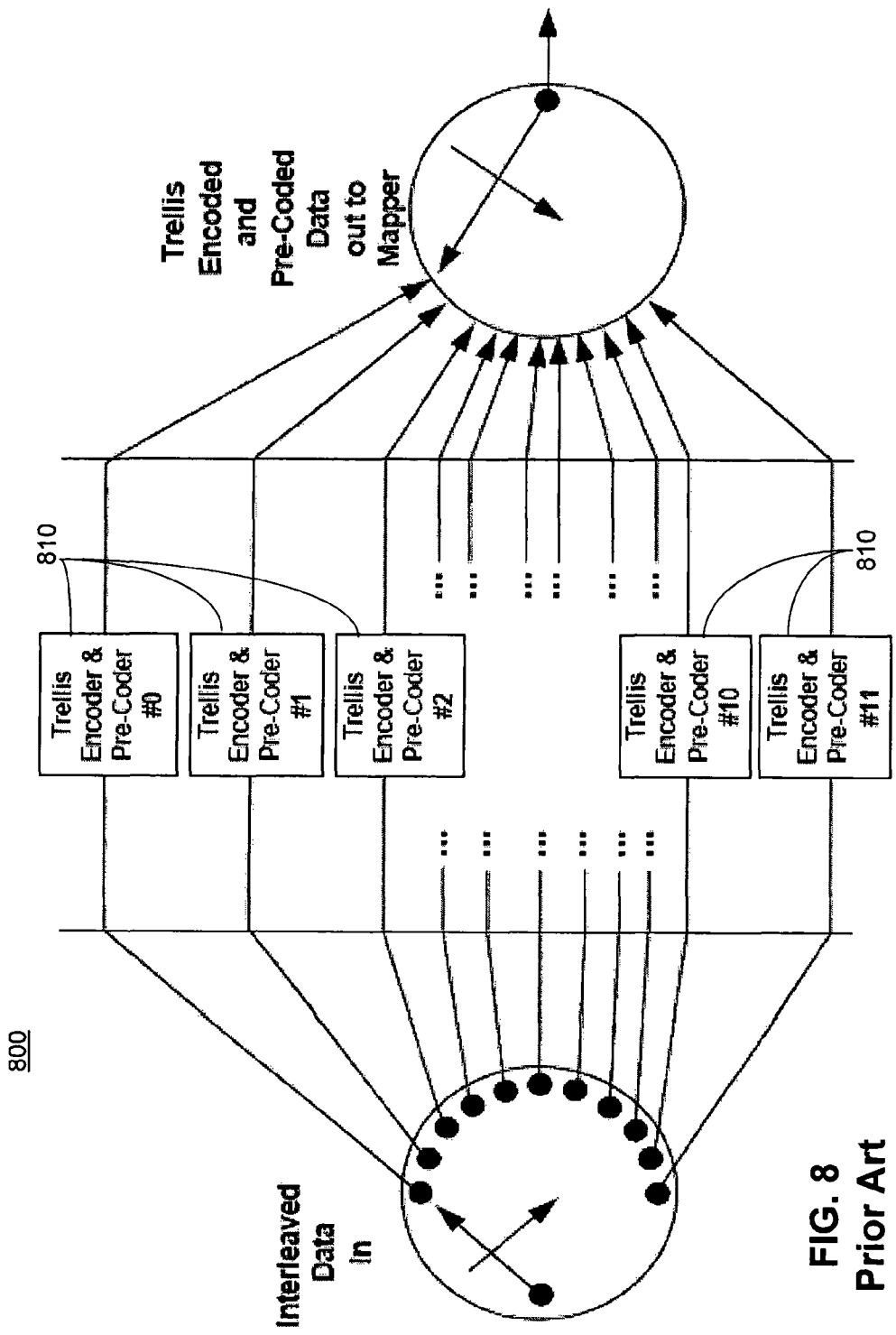
FIG. 8 is a diagram illustrating a trellis code interleaver according to conventional art.
Figure 9:
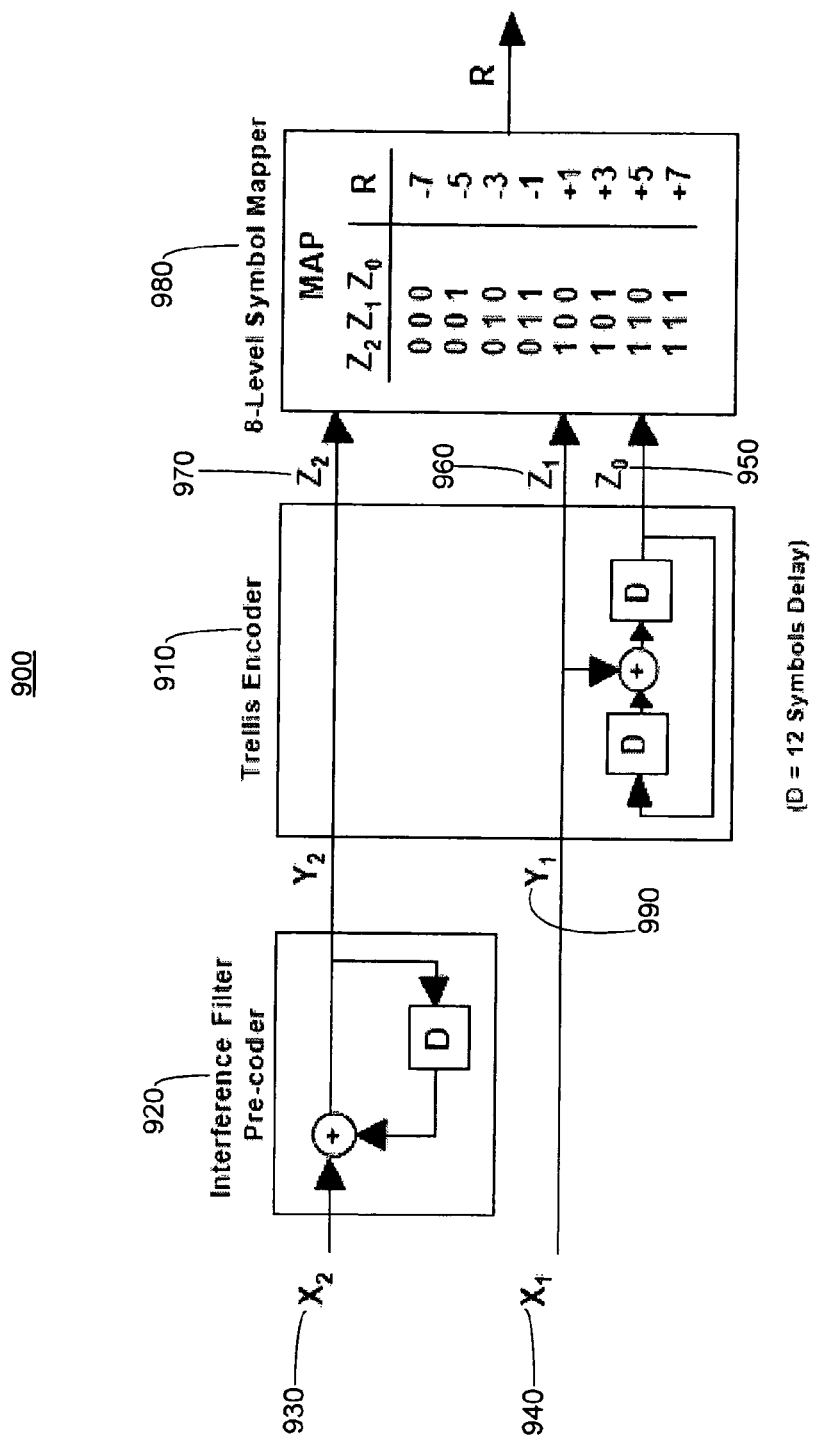
FIG. 9 is a block diagram of 8 VSB trellis encoder, precoder, and symbol mapper according to conventional art.

Referring now to FIGS. 8 and 9, a diagram illustrating the trellis code interleaver 800 and a block diagram illustrating an Trellis Encoder 910, Precoder 920, and Symbol Mapper 980 are shown. Both FIGs illustrate the function of 12-1 Trellis Encoder 165 shown in FIG. 1, which operates in accordance with the ATSC A/53. That is, the data bytes are fed from Byte Interleaver 160 to twelve Trellis Encoder and Pre-coder blocks 810. The data bytes are processed as whole bytes by each one of the twelve trellis encoder and pre-coder pairs. Each byte produces four symbols from one of the twelve pairs.

FIG. 9 illustrates the function of one of the twelve trellis encoder and precoder pairs shown as blocks 810 in FIG. 8. The ATSC A/53 system uses a 2/3-rate trellis code. That is, one input bit X1 (940) is encoded into two output bits Z0 (950) and Z1 (960) using a 1/2-rate convolutional code while the other input bit X2 (930) is processed by a Precoder 920 to produce a single output Z2 (970). The signaling waveform used with the trellis code is an 8-level (3 bit) one-dimensional constellation 980. The transmitted signal is referred to as 8

VSB. Trellis Encoder 910 has four possible states, and Precoder 920 has two possible states.

The trellis coding and precoding divides input bytes into two-bit words and outputs the corresponding three-bit words based upon the two-bit input and the state of precoder 920 and trellis encoder 910. Each possible value of the three-bit output is mapped to one of the eight levels (i.e., −7, −5, −3, −1, 1, 3, 5, and 7) in Symbol Mapper 980 of the 8VSB modulation scheme.

In creating serial bits from parallel bytes, the MSB is sent first. The MSB of each incoming two-bit symbol X2 (930)—i.e., bits 7, 5, 3, 1 of the byte—is precoded, and the LSB of each incoming two-bit symbol X1 (940)—i.e., bits 6, 4, 2, 0—is feedback convolutional encoded. ATSC A/53 uses standard 4-state optimal Ungerboeck codes for the encoding. The combination of Precoder 920 and convolutional Trellis Encoder 910 provides eight possible states and eight possible outputs. The output at a particular time depends upon the state of Precoder 920 and convolutional Trellis Encoder 910 when the input was received at the inputs 930 and 940.

Figure 10:
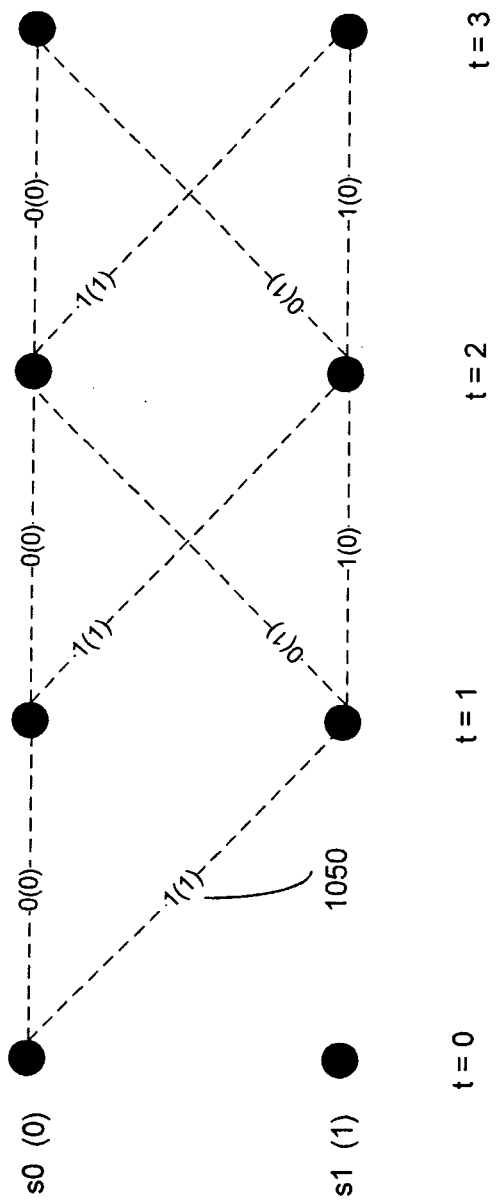
FIG. 10 is a diagram illustrating the operation of one instance of Precoder 920 of FIG. 8 according to conventional art.

Referring now to FIG. 10, a diagram illustrating the operation of one instance of Precoder 920 of FIG. 9 is shown. For the sake of explanation, it is assumed that the initial state of Precoder 920 is 0 at t=0. The input bit X2 (930) of Precoder 920 may be 0 or 1 at t=1. If the input X2 is 0 at t=1, Precoder 920 holds the state 0 and outputs Z2=0. Conversely, if the input X2 is 1 at t=1, then Precoder 920 moves to the state 1 and outputs Z2=1. If the state of Precoder 920 was 1 at t=1 and then Precoder 920 receives input X2=0 at t=2, the output Z2 would be 1—i.e., (the input of 0 at t=2) XOR (the 1 from the delay). However, if the sate of Precoder 920 was 1 at t=1 and then Precoder 920 receives the input 0 at t=2, the output Z2 would be 1—i.e., (the current input X2 of 0 at t=2) XOR (the 1 from the delay=1). In FIG. 10, the description 1(1) of 1050 indicates that the current input X2 is 1 and the output Z2 is 1 (the number in the parenthesis). The state of Precoder 920 under a particular condition is described in a parenthesis as shown with 1050. Precoder 920 operates in the way known to one skilled in the art.

Figure 11:
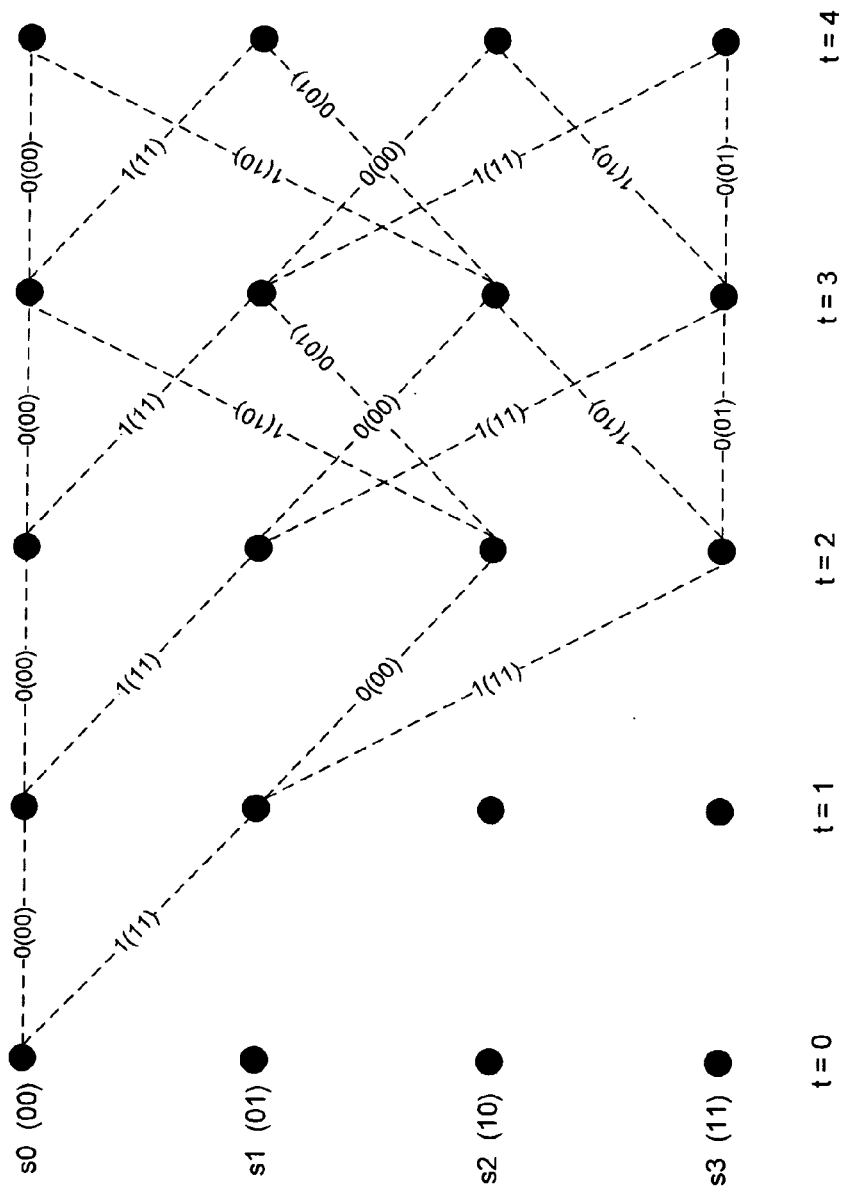
FIG. 11 is a diagram of the operation of one instance of Trellis Encoder 910 of FIG. 8 according to conventional art.

The operation of one instance of Trellis Encoder 910 is demonstrated in FIG. 11. For demonstration purposes, it is assumed the initial state of Trellis Encoder 910 is 00 at time t=0. At t=1, input bit Y1 (990) may be either 0 or 1. If Y1 is 0, the trellis state stays at 00 and outputs Z1=0 and Z0=0. If Y1 is 1 at t=1, the trellis state move to 01 and outputs Z1=1 and Z0=1. The output values (Z1, Z2) of Trellis Encoder 910 at a particular condition is described in a parenthesis in the same manner as shown in FIG. 10. Trellis Encoder 910 operate in the way know to one skilled in the art. It is noted that the current state of each one of Precoder 920 and Encoder 910 is determined based upon the previously received input data.

The ATSC-M/H data bursts are designed for the transmission over a noisy channel, and the M/H data are received along with less robust legacy A/53 data in an interleaved manner. As described above, FIG. 6 shows a diamond-shape of the interleaved data after Byte Interleaver 160 of FIG. 1. Here, in the beginning of an ATSC-M/H burst, legacy ATSC A/53 data is located within the regions 620, the ATSC-M/H preamble is located within the regions 610, and the initial blocks of ATSC-M/H data 630 follow. It is noted that as to the most of the illustrated data segments, represented by rows in FIG. 6, a combination of multiple legacy and M/H data blocks are transmitted in an interleaved manner. For example, as to the segment 20, the data are transmitted, as shown with dotted line 605, in the order of (1) a portion of legacy A/53 data 620, (2) a portion of M/H preamble 610, (3) another portion of legacy A/53 data 620, (4) another portion of M/H preamble 610, (5) another portion of legacy A/53 data 620, (6) another portion of M/H preamble 610, (7) another portion of legacy A/53 data 620, (8) another portion of M/H preamble 610, and (9) another portion of legacy A/53 data 620. Multiple transitions from non-mobile (i.e., legacy A/53) to mobile (i.e., M/H) data occur within each data segment during the transition from the A/53 legacy data to the ATSC-M/H burst, until eventually, the entire segment becomes made of M/H preamble packets 610 near the middle of the diagram.

In an M/H receiver, it may not be easy to keep tracking the state of the trellis decoder while receiving less robust legacy A/53 signals. If the legacy A/53 data are not recoverable, at the beginning of the reception of a sequence of M/H data or M/H preambles, the receiver may be entirely unaware of the state of the trellis at each transition from A/53 to M/H data or to the preambles.

Although it may be possible to reset Trellis Encoder 165 to a predetermined state during the encoding process at each transition from the legacy A/53 data to the M/H data or preambles, this would require many resets to occur during each data segment since the data stream has already been interleaved by Byte Interleaver 160 as shown in FIG. 6. More specifically, two symbols of data (i.e., X1 and X2 of FIG. 9) would need to be reset for each one of the A/53 and the M/H data or preambles at each transition from the A/53 data to the M/H data or to the M/H preambles. Therefore, forcing a reset of Trellis Encoder 165 would incur a large penalty in the extra transmitted data, and it will also force the system to recalculate Reed Solomon code using non-systematic encoder.

Here, it is advantageous to infer the state of Trellis Encoder 165 at the start of each sequence of M/H data or preamble bytes rather than to force a reset. The state of Trellis Encoder 165 may be established statistically at the receiver end, using the knowledge of the trellis structure, the received trellis encoded data, and the predetermined values of the preamble data that are input to Trellis Encoder 165.

Determination of the trellis state is an integral part of trellis decoding. A variety of algorithms exist for decoding trellis-coded data. A sequential decoding mechanism, like the Fano algorithm, or a maximum likelihood algorithm like Viterbi decoding, or a maximum a posteriori probability (MAP) may be used.

These algorithms function without prior knowledge of the data that was trellis encoded. Only the estimate of the received data and the knowledge of the trellis or convolutional code are required for decoding, assuming noise levels and other errors are within the correction capabilities of the code. However, if the decoder has knowledge of the data per se, such knowledge may be used advantageously to speed up the trellis decoding process. More specifically, such knowledge would reduce the number of trellis paths that are assessed or would decrease the number of iterations of the algorithm to more efficiently determine the position of the trellis. As mentioned above, the M/H preambles contain the predetermined data known to the receivers. By using the predetermined knowledge of the preamble, it is possible to determine the trellis state quickly when the reception of the M/H burst begins.

Figure 12:
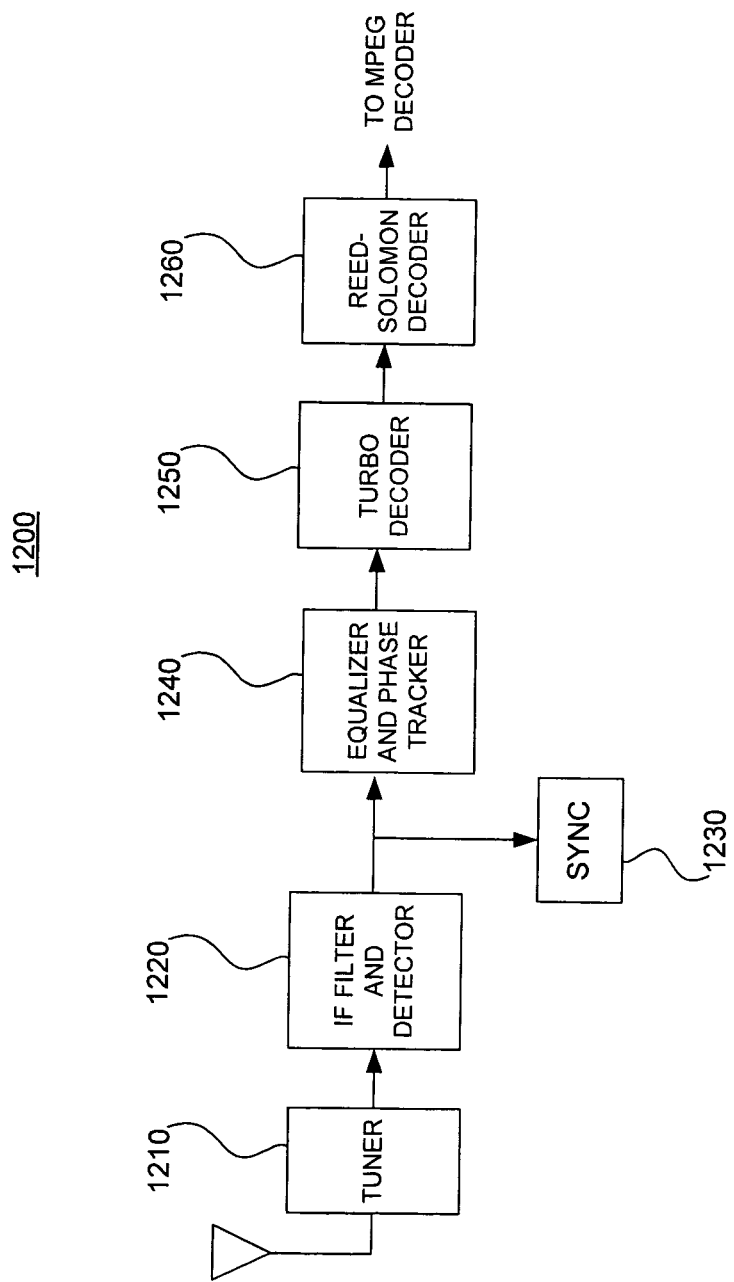
FIG. 12 is a block diagram of an ATSC-M/H receiver according to an exemplary embodiment of the present invention.

Referring now to FIG. 12, a block diagram of an ATSC-M/H receiver 1200 according to an exemplary embodiment of the present invention is shown. The received RF signal is down-converted to an intermediate frequency (IF) by Tuner 1210. The signal is then filtered and converted to digital form by IF Filter and Detector block 1220. The signal is subjected to the synchronization data provided by SYNC 1230 and to the equalization and phase tracking by Equalizer and Phase Tracker 1240. The recovered encoded data symbols are then turbo decoded by Turbo Decoder 1250. The data symbols are then subjected to Reed Solomon decoding by Reed Solomon Decoder 1260.

In one embodiment of the present invention, turbo codes are utilized for the ATSC-M/H data. Turbo codes are decoded using the MAP algorithm. Turbo decoding with the MAP algorithm is possible in the ATSC-M/H system disclosed herein due to the use of the 12/52 rate mode along with the convolutional interleaver as described with respect to FIGS. 3 and 5, respectively.

Figure 13:
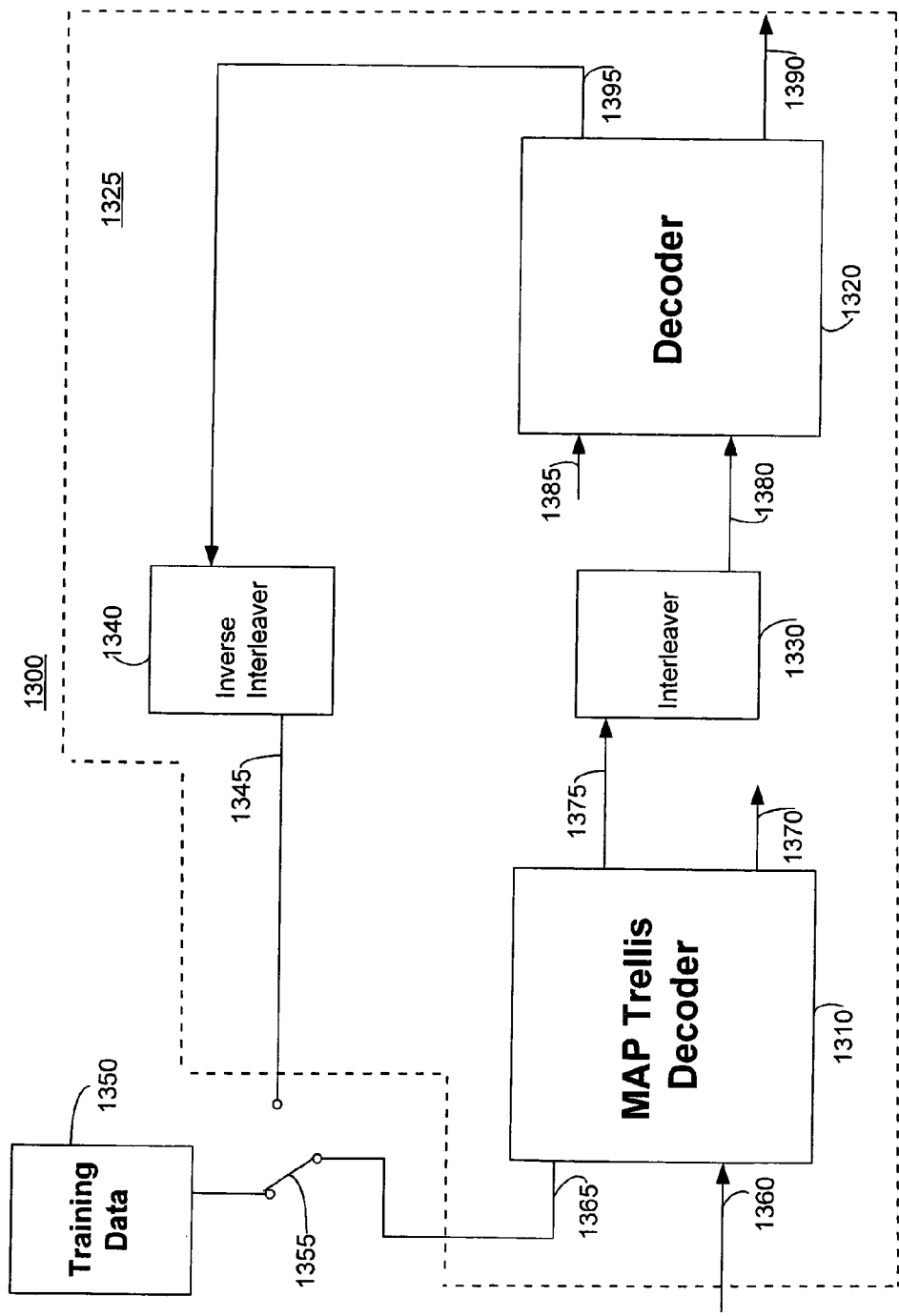
FIG. 13 is a block diagram showing the details of Turbo Decoder 1250 of FIG. 11 according to an exemplary embodiment of the present invention.

Referring now to FIG. 13, a block diagram the detailed arrangement of Turbo Decoder 1250 of FIG. 12 according to an exemplary embodiment of the present invention is shown. The Turbo decoder arrangement 1300 includes the turbo decoder 1325, a source of training data 1350, and selector 1355 illustrated as a switch symbol. Turbo decoder 1310 includes MAP Trellis Decoder 1310, functioning as a 2/3 rate trellis legacy code decoder," Decoder 1320, functioning as a block code decoder, Interleaver 1330, and Inverse-Interleaver 1340.

MAP Trellis Decoder 1310 has a soft input 1360 and an a priori input 1365. The soft input 1360 accepts a probability for each of the eight possible values of the trellis-encoded input symbol, estimated from the received signal. The a priori input 1365 accepts a probability for each of the four possible decoded output symbol values. MAP Trellis Decoder 1310 produces both a soft output 1375 and a hard output 1370. The soft output 1375 is provided for Interleaver 1330. The output of Interleaver 1330 is provided for the soft input 1380 of Decoder 1320. It is noted that the output of Interleaver 1330 is not provided for the a priori input 1385 of Decoder 1320 but provided for the soft input 1380. Decoder 1320 also produces two outputs—a soft output 1395 and a hard output 1390. The soft output 1395 is fed to Inverse Interleaver 1340 to form the MAP feedback loop. The hard output 1390 of Decoder 1320 produces the final two-bit result for each symbol after a number of iterations of the algorithm.

The a priori input 1365 of MAP Trellis Decoder 1310 usually receives an input representing the probabilities of the four possible values of the decoded symbol. However, it is important to be noted that the correct pre-encoding values of the symbols are determined during the reception of training data as the preamble data are already known to the receiver. Thus, instead of feeding the output of Inverse Interleaver 1340 to the a priori input 1365, a probability distribution representing the certainty about the training data 1350 (i.e., preamble data) may be fed to the a priori input 1365 whenever the preamble data is received to improve the function of Turbo Decoder 1250.

This arrangement may be conceptualized as being achieved with a selector 1355 that selects between the predetermined training data (i.e., preamble data) probabilities and the probabilities from the feedback loop 1345. The predetermined training data probabilities are selected when a preamble is received. When receiving preamble data, the predetermined value of each symbol may be assigned to a probability of 1, while the remaining possibilities are assigned to a probability of 0.

With the a priori input 1365, representing certainty about the values of the decoded symbols, and the soft input 1360, representing the estimated probabilities of the eight possible encoded values of the symbol, the algorithm will converge quickly to determine the state of the trellis and produce a hard output 1390 representing the estimated value. These values and the determined trellis state are also then used in the determination for future symbols, including those that are not part of the training data.

Figure 14:
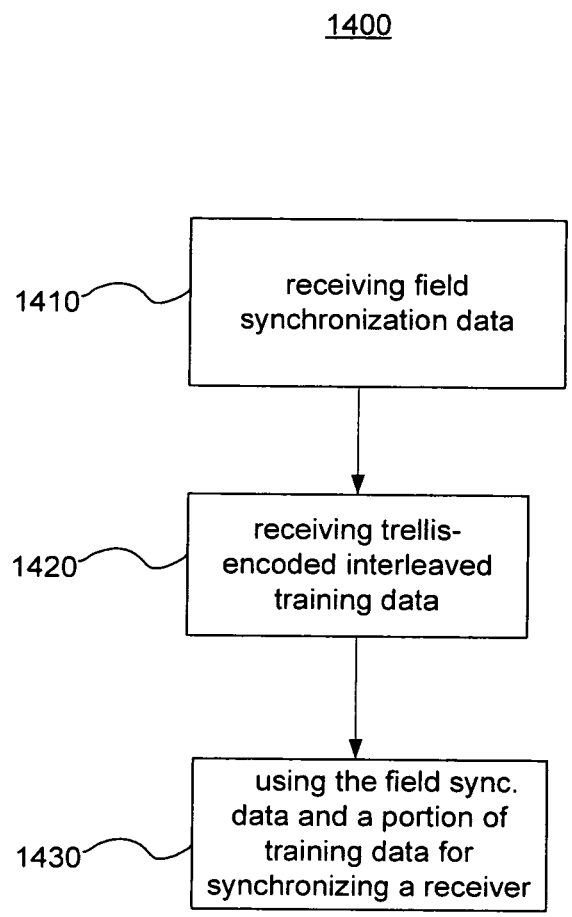
FIG. 14 is a flow chart of another method according to an exemplary embodiment of the present invention.

FIG. 14 is a flowchart describing method 1400 according to an aspect of the present invention. The method includes a first step 1410 of receiving field synchronization data. The second step 1420 involves receiving trellis-encoded interleaved training data. The final step 1430 includes using the field synchronization data and the trellis-encoded interleaved training data for the synchronization of a receiver.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware. Furthermore, various encoding or compression methods may be employed for video, audio, image, text, or other types of data. Also, the packet sizes, rate modes, block coding, and other information processing parameters may be varied in different embodiments of the invention.

The invention claimed is:

1. A method, comprising:
    receiving a stream of video data packets; and
    inserting a plurality of preamble packets into said stream of video data packets,
    wherein said inserting is performed prior to an interleaving of video data contained within a resulting stream of data packets by convolutional interleaving,
    wherein a length of said plurality of preamble packets in time is selected to correspond to a maximum delay of said convolutional interleaving,
    wherein a number of said plurality of preamble packets before rate mode coding is 12, and
    wherein said plurality of preamble packets are encoded with 12/52 rate mode to produce a preamble of two data blocks in length.

2. The method of claim 1 wherein said convolutional interleaving is performed as part of an ATSC A/53 processing path.

3. The method of claim 1 wherein said stream of data packets comprises MPEG packets.

4. The method of claim 1 wherein said plurality of preamble packets comprise MPEG packets.

5. The method of claim 1 wherein the data contained in said plurality of preamble packets comprises pseudo noise generated based upon a polynomial equation.

6. The method of claim 1 wherein said plurality of preamble packets comprise a header with a packet identifier that causes said plurality of preamble packets to be ignored by a legacy receiver.

7. The method of claim 1 wherein said convolutional interleaving is performed by an ATSC A/52 convolutional byte interleaver.

8. The method of claim 1 wherein said interleaving results in preamble data being spread over 104 segments of interleaved data.

9. An apparatus comprising:
    a packet receiver operative to receive a stream of video data packets; and
    a preamble packet inserter operative to insert a plurality of preamble packets into said stream of video data packets,
    wherein said packet inserter performs packet insertion prior to processing by an interleaver that uses convolutional interleaving to interleave video data contained within a resulting stream of data packets,
    wherein a length of said plurality of preamble packets in time inserted by said preamble packet inserter corresponds to a maximum delay introduced by said interleaver, wherein a number of said plurality of preamble packets before rate mode coding is 12, and wherein said plurality of preamble packets are encoded with 12/52 rate mode to produce a preamble of two data blocks in length.

10. The apparatus of claim 9 wherein said convolutional interleaving is performed as part of an ATSC A/53 processing path.

11. The apparatus of claim 9 wherein said stream of data packets comprises MPEG packets.

12. The apparatus of claim 9 wherein said plurality of preamble packets comprise MPEG packets.

13. The apparatus of claim 9 wherein the data contained in said plurality of preamble packets comprises pseudo noise generated based upon a polynomial equation.

14. The apparatus of claim 9 wherein said plurality of preamble packets comprise a header with a packet identifier that causes said plurality of preamble packets to be ignored by a legacy receiver.

15. The apparatus of claim 9 wherein said interleaver is an ATSC A/52 convolutional byte interleaver.

16. The apparatus of claim 9 wherein said interleaver spreads said preamble data over 104 segments of interleaved data.

17. An apparatus comprising:
   first means for receiving a stream of video data packets; and
   second means for inserting a plurality of preamble packets into said stream of video data packets,
   wherein said second means is operative on said data stream prior to an operation by third means for interleaving video data contained within a resulting stream of data packets by convolutional interleaving,
   wherein a length of said plurity of preamble packets in time is selected to correspond to a maximum delay of said convolutional interleaving,
   wherein a number of said plurity of preamble packets before rate mode coding is 12, and
   wherein said plurity of preamble packets are encoded with 12/52 rate mode to produce a preamble of two data blocks in length.

18. The apparatus of claim 17 wherein said convolutional interleaving is performed as part of an ATSC A/53 processing path.

19. The apparatus of claim 17 wherein said stream of data packets comprises MPEG packets.

20. The apparatus of claim 17 wherein said plurality of preamble packets comprise MPEG packets.

21. The apparatus of claim 17 wherein the data contained in said plurality of preamble packets comprises pseudo noise generated based upon a polynomial equation.

22. The apparatus of claim 17 wherein said plurity of preamble packets comprise a header with a packet identifier that causes said plurity of preamble packets to be ignored by a legacy receiver.

23. The apparatus of claim 17 wherein said packet interleaver is an ATSC A/52 convolutional byte interleaver.

24. The apparatus of claim 17 wherein said packet interleaver spreads said preamble data over 104 segments of interleaved data.

* * * * *